US012449610B2

(12) United States Patent
Erdman et al.

(10) Patent No.: US 12,449,610 B2
(45) Date of Patent: Oct. 21, 2025

(54) MULTI-FIBER REUSABLE SPLICING SYSTEMS

(71) Applicant: CommScope Technologies LLC, Hickory, NC (US)

(72) Inventors: David Donald Erdman, Hummelstown, PA (US); Josiah D. Kadar-Kallen, Harrisburg, PA (US); Robert Charles Flaig, Lancaster, PA (US)

(73) Assignee: COMMSCOPE TECHNOLOGIES LLC, Claremont, NC (US)

( * ) Notice: Subject to any disclaimer, the term of this patent is extended or adjusted under 35 U.S.C. 154(b) by 224 days.

(21) Appl. No.: 18/043,434

(22) PCT Filed: Aug. 24, 2021

(86) PCT No.: PCT/US2021/047364
§ 371 (c)(1),
(2) Date: Feb. 28, 2023

(87) PCT Pub. No.: WO2022/046780
PCT Pub. Date: Mar. 3, 2022

(65) Prior Publication Data
US 2023/0324625 A1 Oct. 12, 2023

Related U.S. Application Data

(60) Provisional application No. 63/140,524, filed on Jan. 22, 2021, provisional application No. 63/104,672, (Continued)

(51) Int. Cl.
*G02B 6/38* (2006.01)

(52) U.S. Cl.
CPC ......... *G02B 6/3809* (2013.01); *G02B 6/3849* (2013.01); *G02B 6/38875* (2021.05); *G02B 6/3893* (2013.01); *G02B 6/3897* (2013.01)

(58) Field of Classification Search
CPC .... G02B 6/38; G02B 6/3809; G02B 6/38875; G02B 6/3849; G02B 6/3893
See application file for complete search history.

(56) References Cited

U.S. PATENT DOCUMENTS 6,491,442 B1 * 12/2002 Murakami ............. G02B 6/389
385/59
9,575,272 B2 2/2017 Ott et al.
(Continued)

FOREIGN PATENT DOCUMENTS

WO 2016043922 A1 3/2016
WO 2016100384 A1 6/2016
(Continued)

OTHER PUBLICATIONS

International Search Report for PCT/US2021/047364 mailed Dec. 21, 2021.

*Primary Examiner* — Tina Wong
(74) *Attorney, Agent, or Firm* — MERCHANT & GOULD P.C.

(57) ABSTRACT

The present disclosure relates generally to a bare fiber connection system that includes first and second multi-fiber fiber optic connectors that have a low profile and are mounted in a multi-fiber adapter. The multi-fiber fiber optic connectors are bare fiber connectors that each include a connector body and a plurality of optical fibers extending through the connector body. The bare fiber connection system includes a latching arrangement for securing the first and second multi-fiber fiber optic connectors respectively in first and second adapter ports. One aspect of the present disclosure relates to the first and second multi-fiber fiber optic connectors and the multi-fiber adapter lacking integrated structures for releasing the first and second multi-fiber fiber optic connectors from the first and second adapter ports. Another aspect of the present disclosure relates to a (Continued)

release key that is separate from the first and second multi-fiber fiber optic connectors and the multi-fiber adapter for releasing the first and second multi-fiber fiber optic connectors from the first and second adapter ports of the multi-fiber adapter.

18 Claims, 36 Drawing Sheets

Related U.S. Application Data filed on Oct. 23, 2020, provisional application No. 63/071,792, filed on Aug. 28, 2020.

(56) References Cited

U.S. PATENT DOCUMENTS

| | | |
|---|---|---|
| 2009/0087157 A1 | 4/2009 | Smith et al. |
| 2018/0329155 A1 | 11/2018 | Verheyden |
| 2020/0018904 A1 | 1/2020 | Kadar-Kallen et al. |
| 2020/0225422 A1 | 7/2020 | Van Baelen et al. |

FOREIGN PATENT DOCUMENTS

| | | |
|---|---|---|
| WO | 2017081306 A1 | 5/2017 |
| WO | 2020046709 A1 | 3/2020 |
| WO | 2020079326 A1 | 4/2020 |
| WO | 2020112645 A1 | 6/2020 |
| WO | 2021163063 A1 | 8/2021 |

* cited by examiner

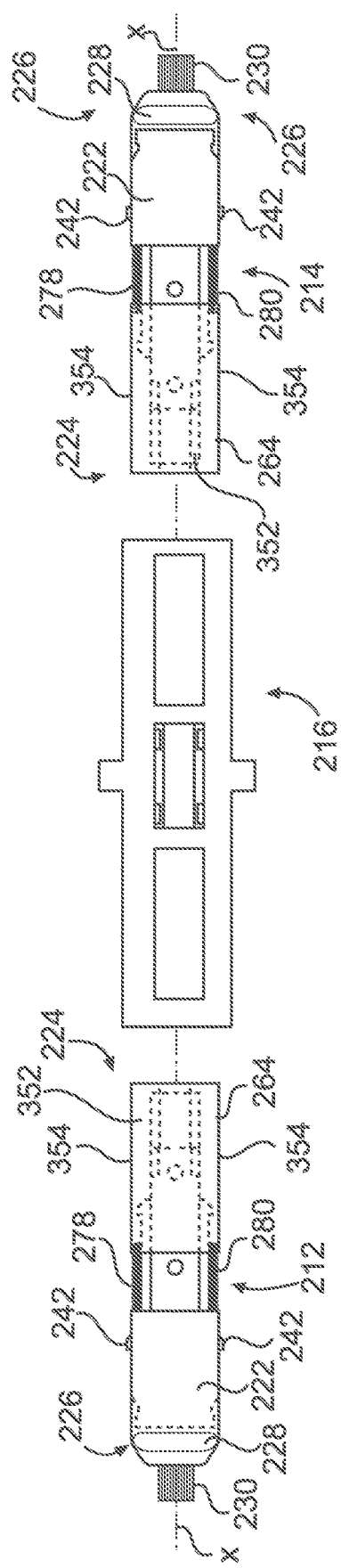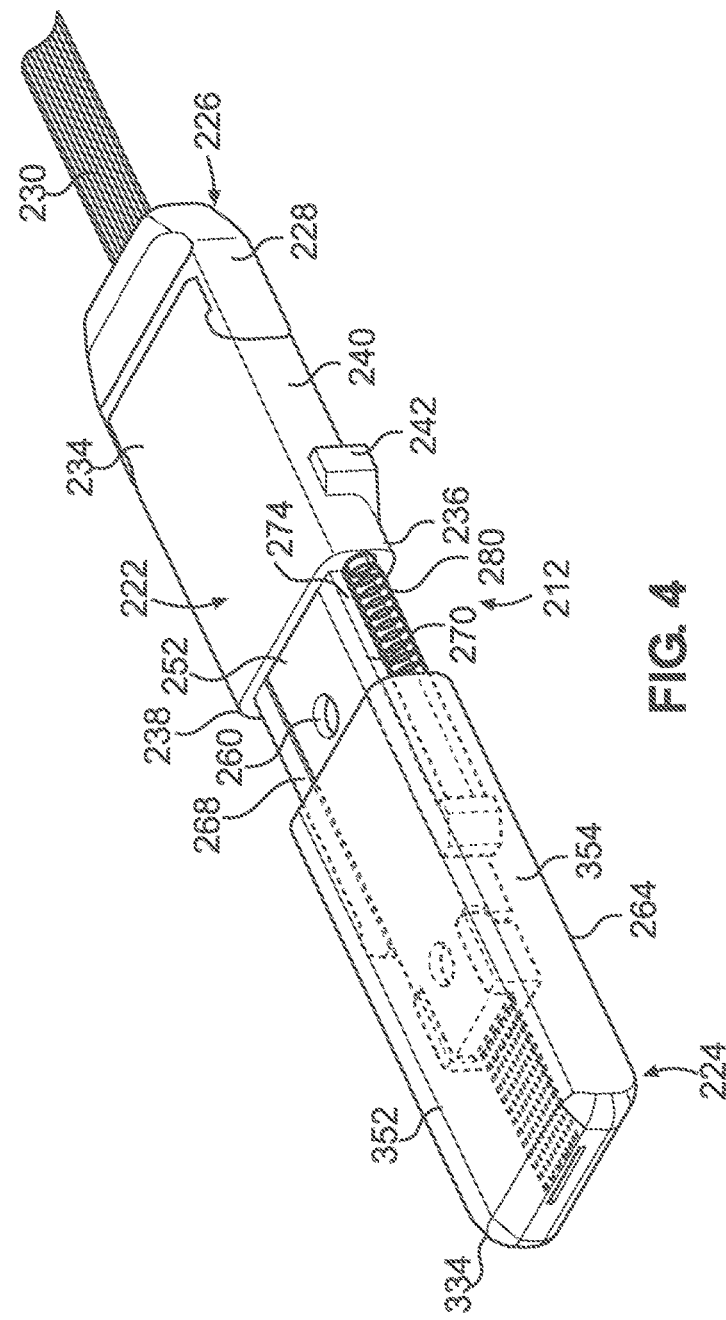

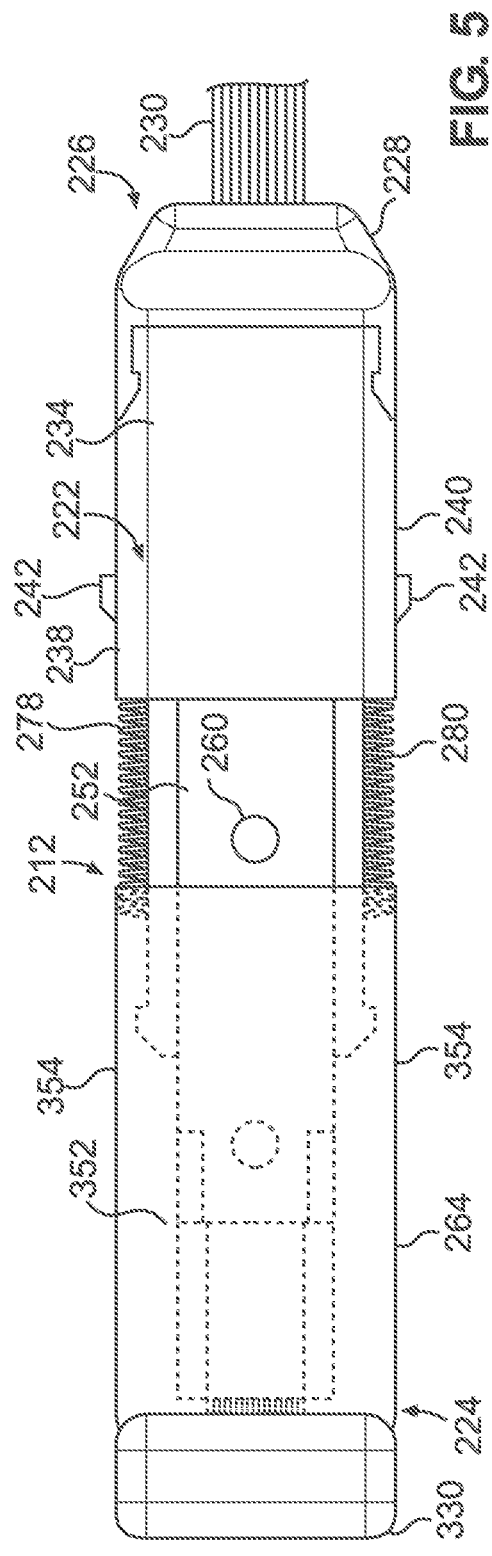
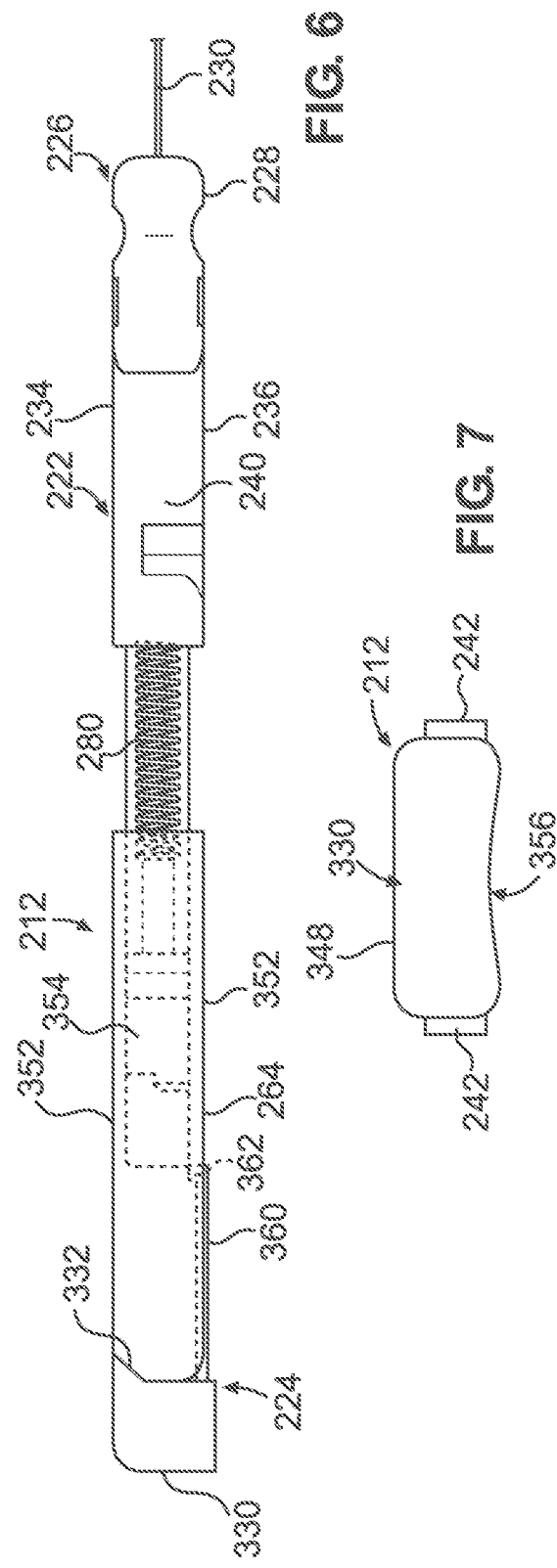

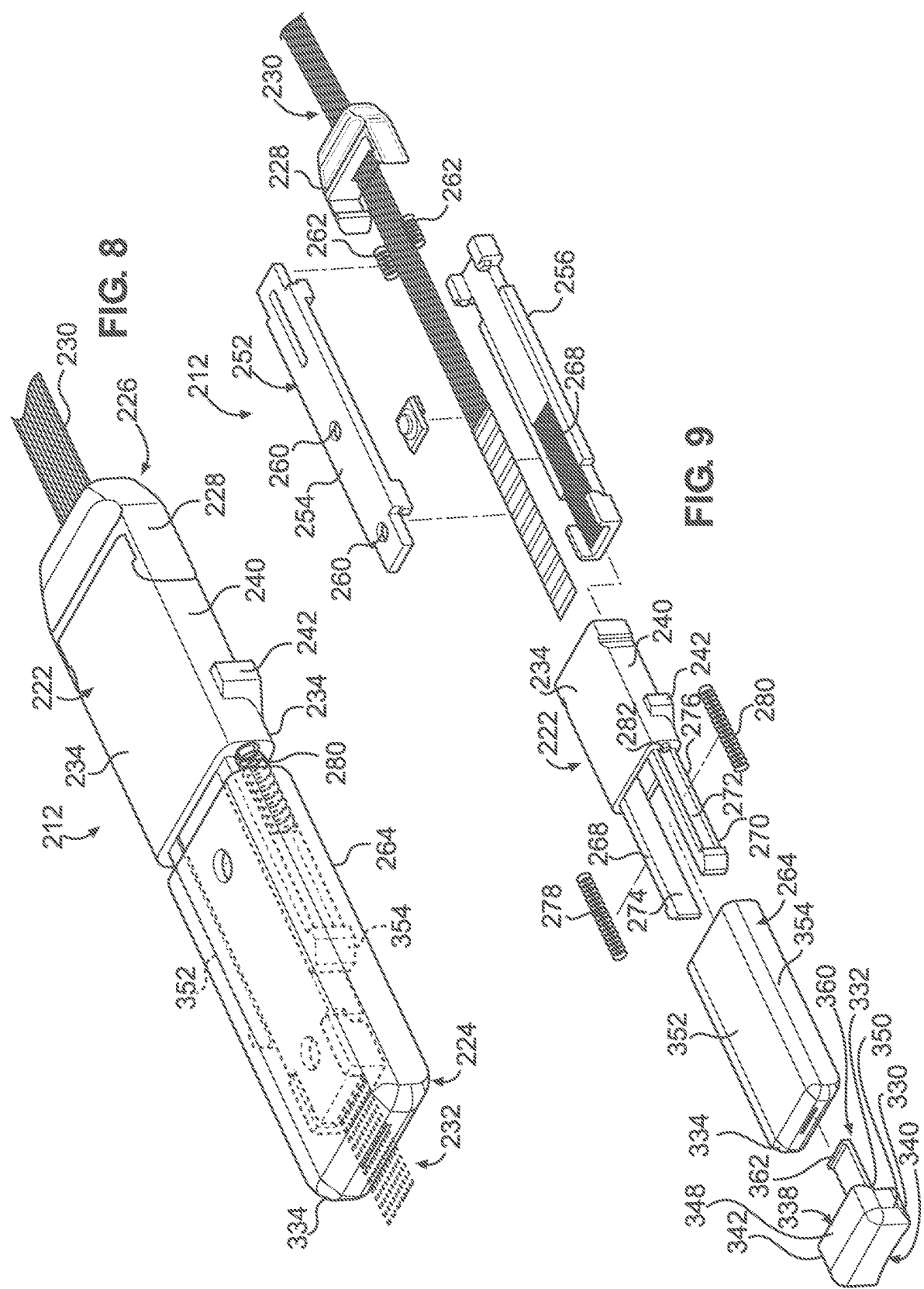

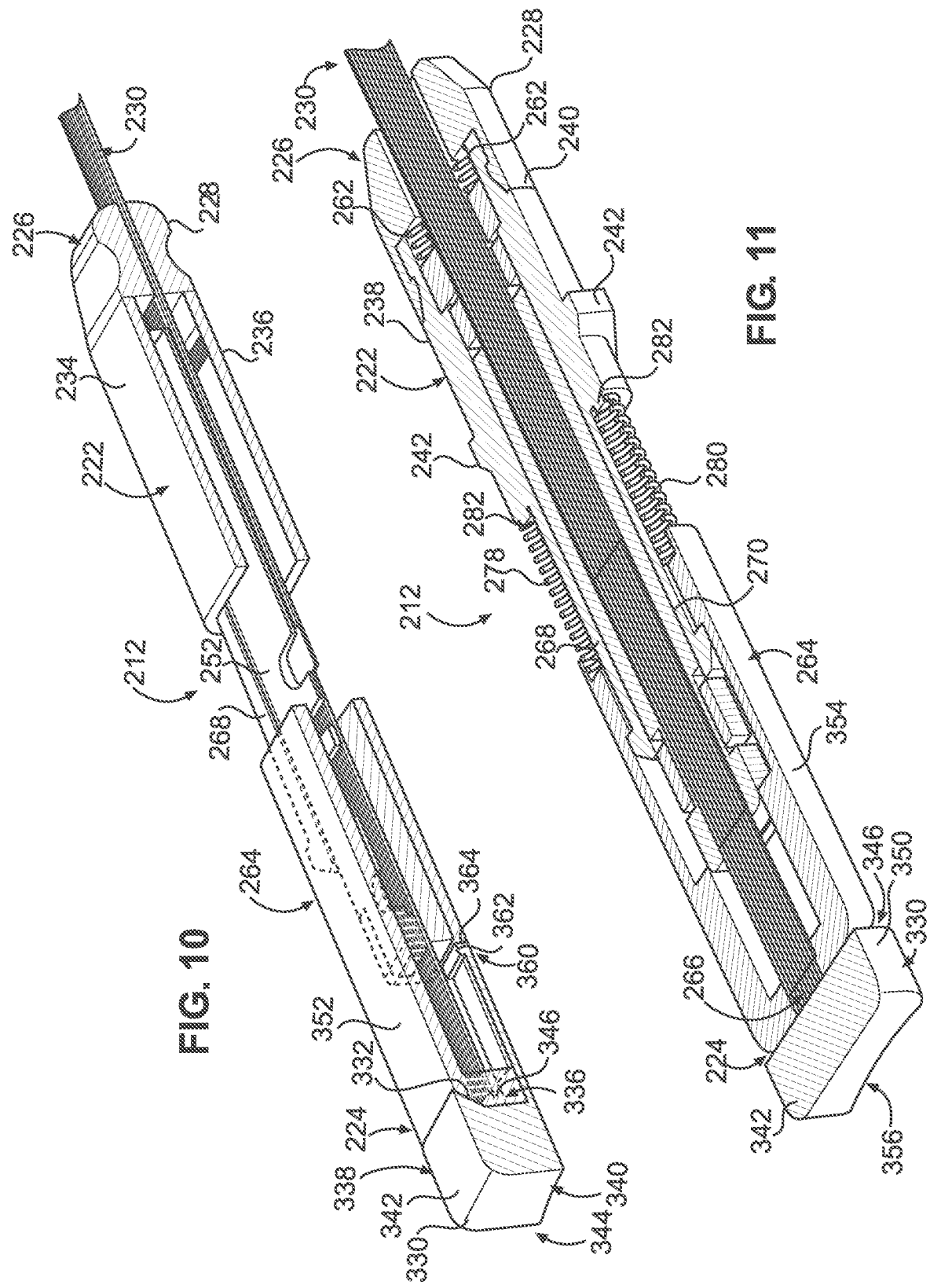

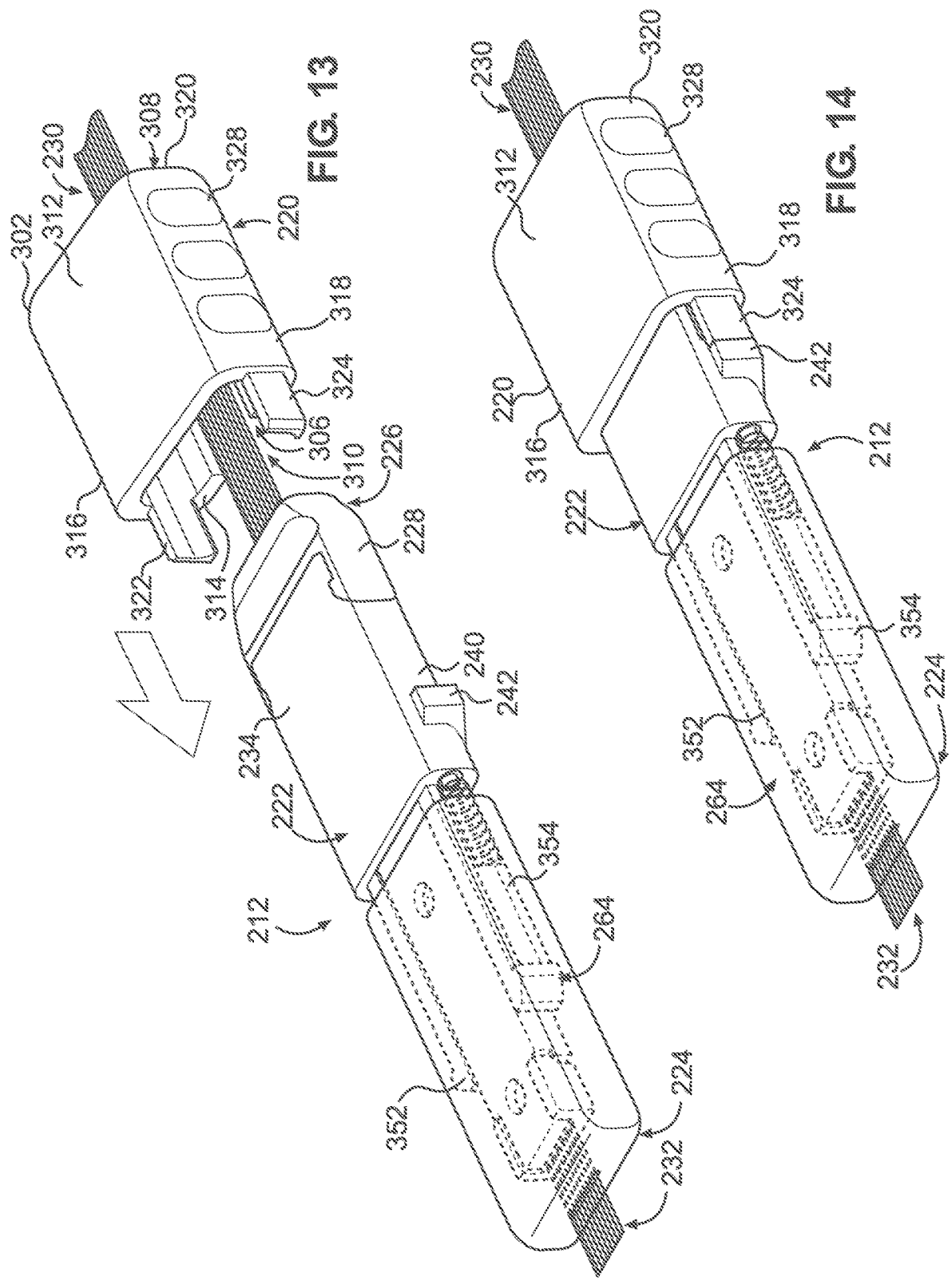

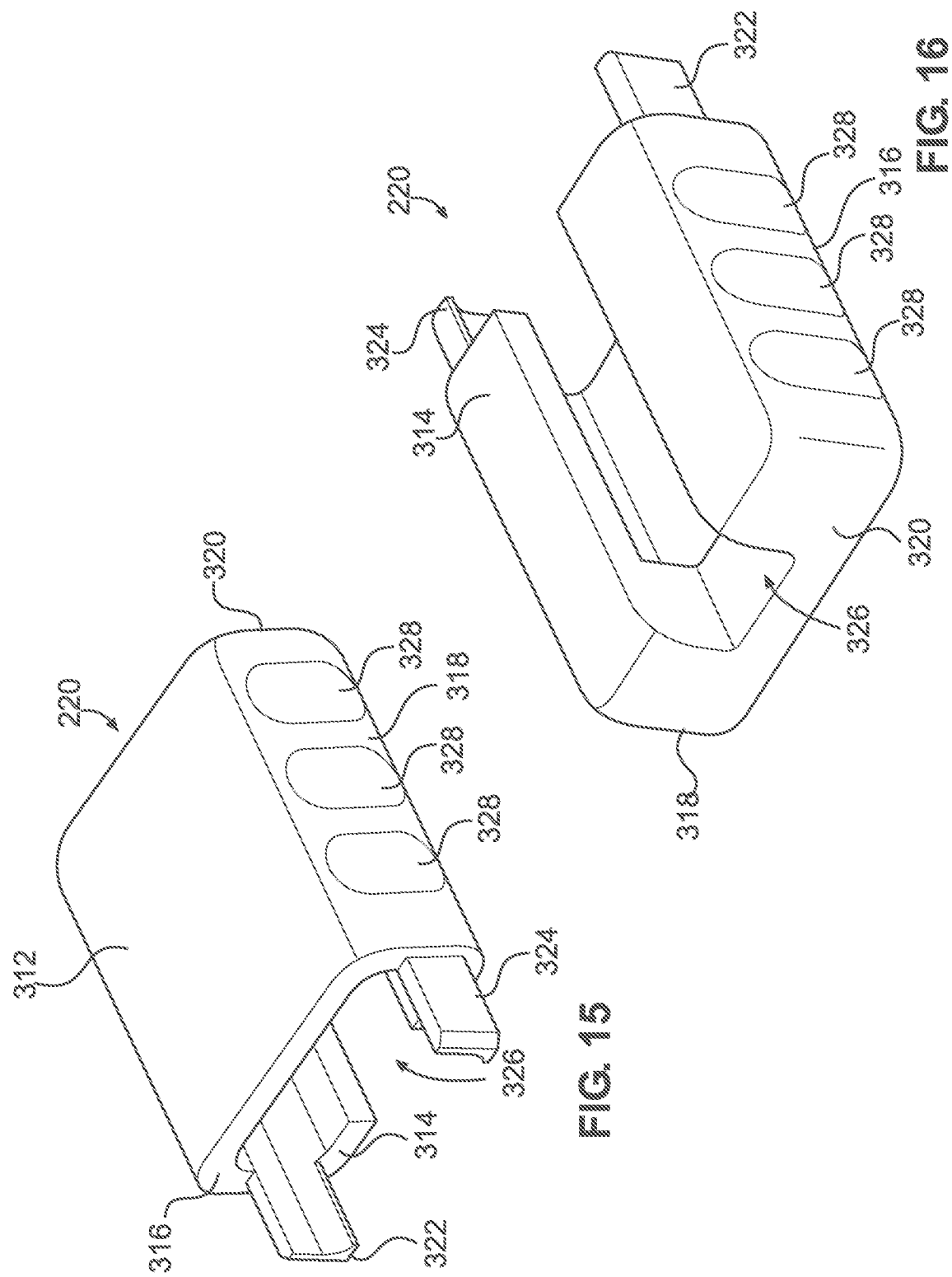

MULTI-FIBER REUSABLE SPLICING SYSTEMS

CROSS-REFERENCE TO RELATED APPLICATIONS

This application is being filed as a National Stage Application of PCT International Patent Application PCT/US2021/047364, filed Aug. 24, 2021 and claims priority to U.S. Provisional Patent Application Nos. 63/071,792, filed Aug. 28, 2020; 63/104,672, filed Oct. 23, 2020; and 63/140,524, filed Jan. 22, 2021; the disclosures of which are incorporated herein by reference in their entireties.

TECHNICAL FIELD

The present disclosure relates generally to multi-fiber connectivity. More particularly, the present disclosure relates to multi-fiber connection systems and bare-fiber connectors.

BACKGROUND

Fiber optic connectors are commonly used in optical fiber communication systems to effect demateable optical connections between waveguides such as optical fibers. A typical optical connection is made by co-axially aligning two optical fibers in end-to-end relation with end faces of the optical fibers opposing one another. To effect optical coupling and minimize Fresnel loss, it is typically preferred for "physical contact" to exist between the optical waveguides, which, in the case of optical connectors, is generally between the opposed end faces of the aligned optical fibers.

Traditionally optical connectors have employed "ferrules." Ferrules are well-known components, which each hold one or more optical fibers such that the end faces of the optical fibers are presented for optical coupling. For example, traditional single fiber optical connectors such as SC or LC connectors include cylindrical ferrules with optical fibers supported and precisely centered within the ferrules. A traditional multi-fiber optical connector such as an MPO connector can include a ferrule that supports a plurality of optical fibers in a row. In the case of MPO connectors, the ferrules of two fiber optic connectors desired to be coupled together have a mating male and female configuration (e.g., a pin and socket configuration) which aligns the ferrules and concurrently aligns the plurality of optical fibers supported by the ferrules.

Another type of fiber optic connector can be referred to as a ferrule-less fiber optic connector or bare fiber connector. In a bare fiber optic connector, an end portion of an optical fiber corresponding to the bare fiber optic connector is not supported by a ferrule. Instead, the end portion of the optical fiber is a free end portion. Similar to the ferruled connectors described above, fiber optic adapters can be used to assist in optically coupling together two bare fiber optic connectors. Fiber optical adapters for bare fiber connectors can include internal fiber alignment devices configured to receive optical fibers of bare fiber optic connectors desired to be optically coupled together and to align the fiber tips of the bare fiber optic connectors to enable the transfer of optical signals there between.

SUMMARY

The present disclosure relates generally to a multi-fiber reusable mechanical splicing system. The multi-fiber reusable mechanical splicing system includes a low profile bare fiber optic connector that allows the multi-fiber bare fiber optic connector to be easily deployed and pulled through inner ducting in a conduit.

The multi-fiber bare fiber optic connector includes a connector body, a fiber holder mounted within the connector body, a plurality of optical fibers anchored to the fiber holder such that free end portions project forwardly from the connector body, a retractable shroud that mounts at a front end of the connector body, and first and second outboard springs for biasing the shroud to a forward position relative to the connector body. The first outboard spring is positioned adjacent a first minor side of the connector body and the second outboard spring is positioned adjacent a second minor side of the connector body.

The fiber holder can be positioned between the first and second outboard springs, where the first and second outboard springs have lengths that extend along a longitudinal axis of the connector body.

The multi-fiber reusable mechanical splicing system may include a multi-fiber adapter that defines an adapter port for receiving the bare fiber optic connector.

The multi-fiber reusable mechanical splicing system may also include a release key that is separate from the multi-fiber bare fiber optic connector and the multi-fiber adapter for releasing the multi-fiber bare fiber optic connector from the multi-fiber adapter.

These and other features and advantages will be apparent from a reading of the following detailed description and a review of the associated drawings. A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

BRIEF DESCRIPTION OF THE DRAWINGS

The following drawings are illustrative of particular embodiments of the present disclosure and therefore do not limit the scope of the present disclosure. Embodiments of the present disclosure will hereinafter be described in conjunction with the appended drawings, wherein like numerals denote like elements.

FIG. 3 illustrates a top view of the bare fiber connection system of FIG. 1 showing the first and second multi-fiber fiber optic connectors exploded from the multi-fiber adapter.

FIG. 4 illustrates a perspective view of the first multi-fiber fiber optic connector of FIG. 3 showing a shroud in an extended position.

FIG. 5 illustrates a top view of the first multi-fiber fiber optic connector of FIG. 4 with a dust cap in accordance with the principles of the present disclosure.

FIG. 6 illustrates a side view of the first multi-fiber fiber optic connector of FIG. 5.

FIG. 7 illustrates an end view of the first multi-fiber fiber optic connector of FIG. 5.

FIG. 8 illustrates a perspective view of the first multi-fiber fiber optic connector of FIG. 4 with the shroud in a retracted position in accordance with the principles of the present disclosure.

FIG. 9 illustrates an exploded view of the first multi-fiber fiber optic connector of FIG. 5.

FIG. 10 illustrates a cross-sectional schematic view of the first multi-fiber fiber optic connector of FIG. 5.

FIG. 11 illustrates another cross-sectional schematic view of the first multi-fiber fiber optic connector of FIG. 5.

FIGS. 13-14 illustrate how the release key is mounted to the first multi-fiber fiber optic connector.

FIGS. 15-16 illustrate perspective views of the release key of FIG. 12.

DETAILED DESCRIPTION

Figure 1:
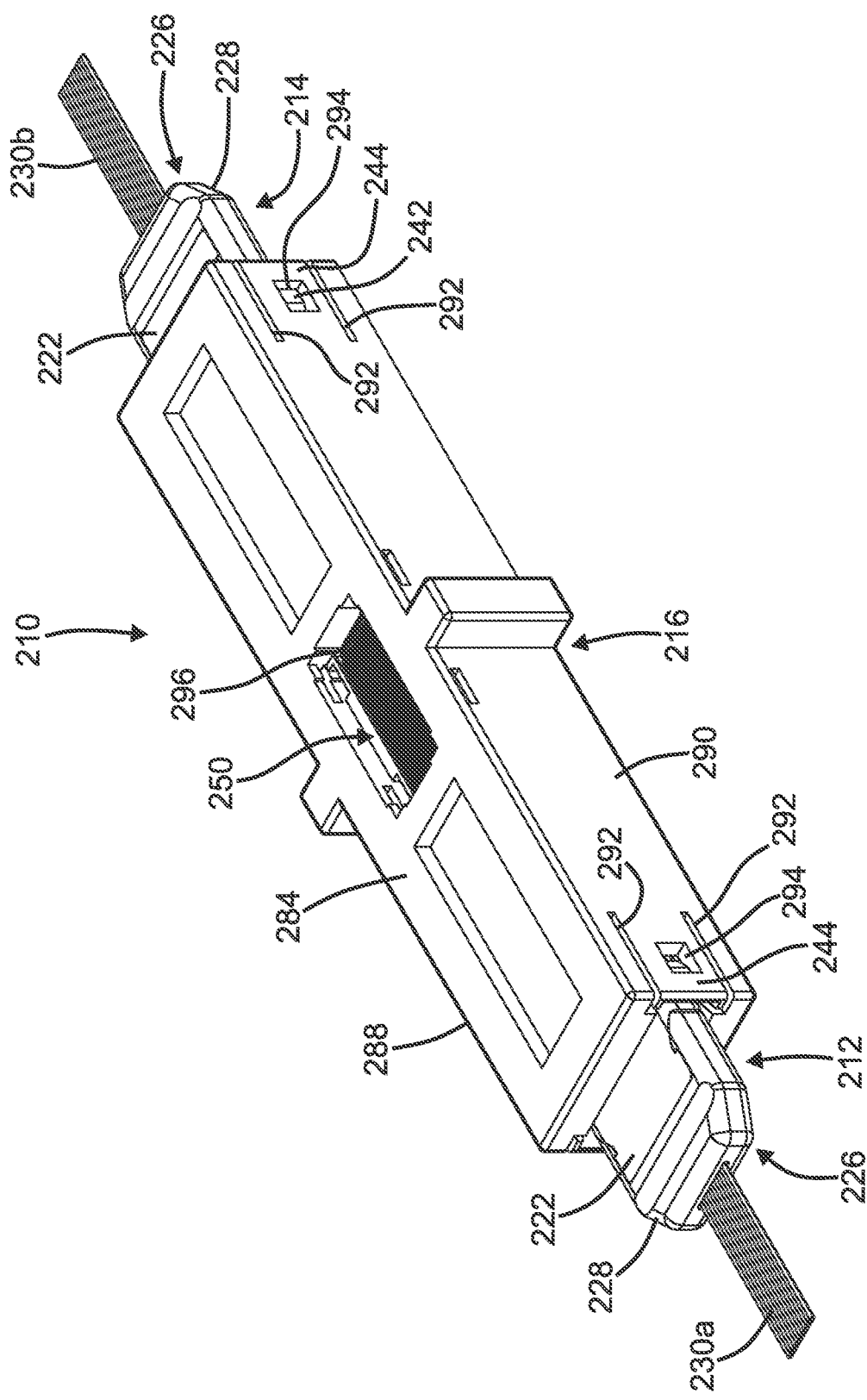
FIG. 1 illustrates a perspective view of a bare fiber connection system including first and second multi-fiber fiber optic connectors mounted to a multi-fiber adapter, each of the first and second multi-fiber fiber optic connectors having a plurality of optical fibers in accordance with principles of the present disclosure.

Various embodiments of the present invention will be described in detail with reference to the drawings, wherein like reference numerals represent like parts and assemblies throughout the several views. Reference to various embodiments does not limit the scope of the invention. Additionally, any examples set forth in this specification are not intended to be limiting and merely set forth some of the many possible embodiments.

The present disclosure is directed to a bare fiber connection system that includes a low profile multi-fiber fiber optic connector. The multi-fiber fiber optic connector includes catches that engage latches of a multi-fiber adapter to allow the multi-fiber fiber optic connector to be mated within an adapter port of the multi-fiber adapter. The multi-fiber fiber optic connector also includes spring retaining grooves on minor sides of the multi-fiber fiber optic connector to receive outboard springs that contribute to the low profile of the multi-fiber fiber optic connector.

The present disclosure also relates to a release key that is separate from the multi-fiber fiber optic connector and the multi-fiber adapter. The release key can be used to disengage the latches of the multi-fiber adapter from the catches of the multi-fiber fiber optic connector to allow the multi-fiber fiber optic connector to be removed from the adapter port of the multi-fiber adapter to provide a reusable splice.

Figure 2:
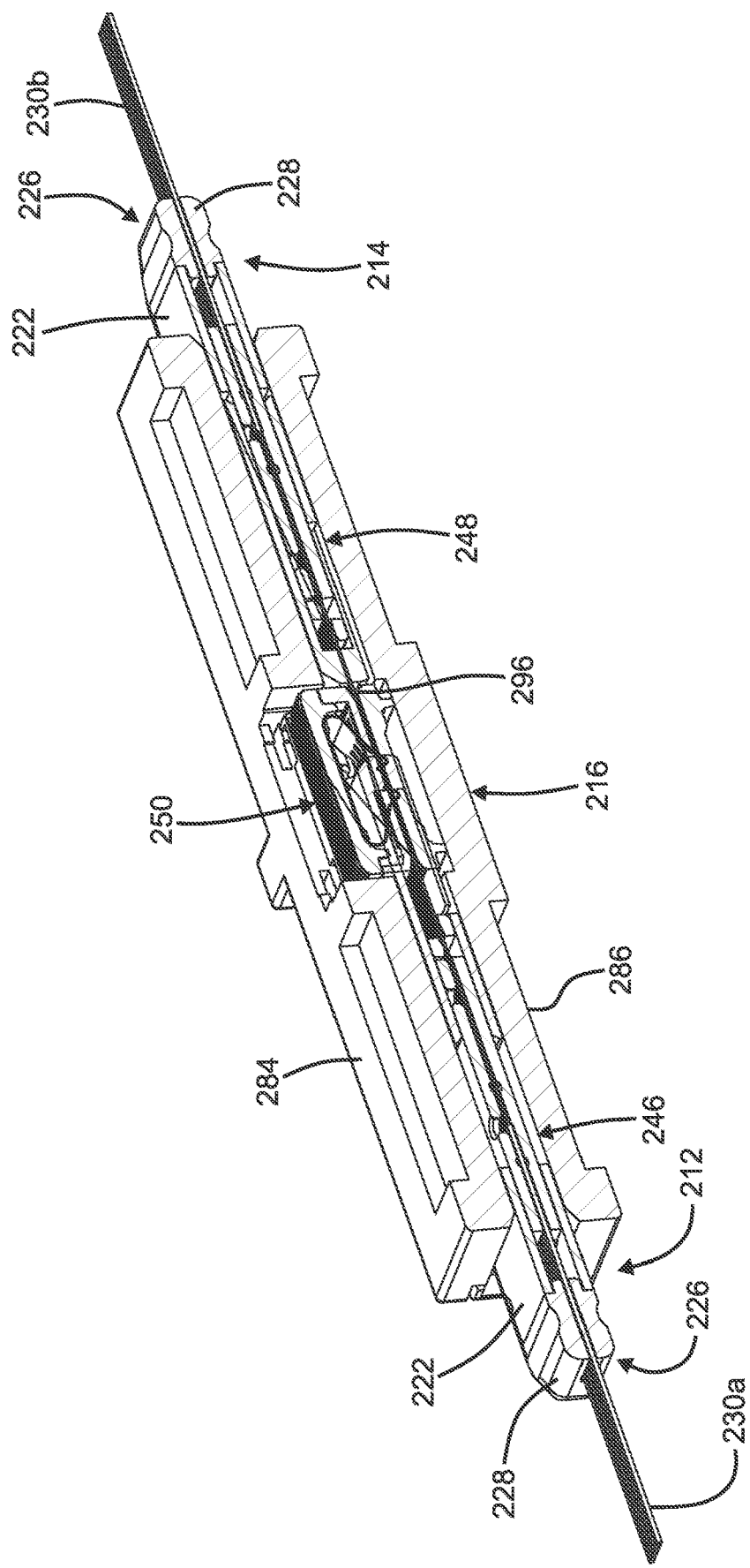
FIG. 2 illustrates a cross-sectional view of the bare fiber connection system of FIG. 1.

FIGS. 1-3 illustrate an example bare fiber connection system 210 in accordance with the principles of the present disclosure. The bare fiber connection system 210 includes a first multi-fiber fiber optic connector 212, a second multi-fiber fiber optic connector 214, a multi-fiber adapter 216, and a release key 220 (e.g., adapter key) (see FIG. 12) that is separate from the first and second multi-fiber fiber optic connectors 212, 214 and the multi-fiber adapter 216. In the depicted example, the first and second multi-fiber fiber optic connectors 212, 214 are bare fiber multi-fiber fiber optic connectors.

The first and second multi-fiber fiber optic connectors 212, 214 each include a connector body 222 that has a front end 224 and a rear end 226. The connector body 222 defines a longitudinal axis X that extends through the connector body 222 in an orientation that extends from the front end 224 to the rear end 226 of the connector body 222.

In certain examples, the connector body 222 can include two pieces. For example, a rear piece connector body 228 can be mounted to the connector body 222 by a snap-fit connection, although alternatives are possible.

The first multi-fiber fiber optic connector 212 includes a first plurality of optical fibers 230*a* that extend through the connector body 222 from the rear end 226 to the front end 224. The second multi-fiber fiber optic connector 214 includes a second plurality of optical fibers 230*b* that extend through the connector body 222 from the rear end 226 to the front end 224. The first and second plurality of optical fibers 230*a*, 230*b* have fiber ends 232 (e.g., free end portions, bare fiber portions) that are respectively accessible at the front ends 224 of the connector bodies 222 of the first and second multi-fiber fiber optic connectors 212, 214. In certain examples, the first and second plurality of optical fibers 230*a*, 230*b* may be ribbonized, buffered, or otherwise contained within a passage of an outer jacket. In the example shown, there are twelve optical fibers 230. In certain examples, however, the first and second multi-fiber fiber optic connectors 212, 214 may include a greater or lesser number of optical fibers 230 (e.g., one fiber, two fibers, six fibers, eight fibers, twenty-four fibers, etc.).

Turning to FIGS. 4-8, the first multi-fiber fiber optic connector 212 is depicted. The first and second multi-fiber optic connectors 212, 214 are identical. As such, only the first multi-fiber fiber optic connector 212 will be described in detail. It will be appreciated that the features described herein with reference to the first multi-fiber fiber optic connector 212 will also apply to the second multi-fiber fiber optic connector 214.

The connector body 222 has a first major side (e.g., top side) 234, an opposite, second major side (e.g., bottom side) 236, a first minor side 238, and an opposite, second minor side 240. In certain examples, the first and second minor sides 238, 240 of the connector body 222 includes a fixed catch 242 that engages latches 244 of the multi-fiber adapter 216 as part of a latching arrangement 218 to allow the first multi-fiber fiber optic connector 212 to be secured (e.g., interlocked) within a mating first adapter port 246 (see FIG. 2) of the multi-fiber adapter 216.

The multi-fiber adapter 216 can be used to assist in optically coupling together the first and second multi-fiber fiber optic connectors 212, 214. The multi-fiber adapter 216 can also include a second adapter port 248 (see FIG. 2) opposite the first adapter port 246 for respectively receiving the second multi-fiber fiber optic connector 214 to couple the first and second multi-fiber fiber optic connectors 212, 214 together.

The multi-fiber adapter 216 includes a groove-defining piece 250 (e.g., internal bare fiber alignment piece, alignment device) (see FIG. 23) positioned between the first and second adapter ports 246, 248. The groove-defining piece 250 defines multiple fiber alignment grooves 296 (e.g., alignment passages) (see FIG. 23) for receiving and co-axially aligning the fiber ends 232 of the first and second plurality of optical fibers 230*a*, 230*b* such that optical signals can be conveyed between the first and second plurality of optical fibers 230*a*, 230*b* of the first and second multi-fiber fiber optic connectors 212, 214.

Turning to FIG. 9, the bare fiber connection system 210 can include a fiber holder 252. The fiber holder 252 can be mounted in the first multi-fiber fiber optic connector 212. In certain examples, the fiber holder 252 may include a cover 254 and a base 256. The cover 254 can be mounted to the base 256 via a snap-fit connection, a press-fit connection, or a pivotal connection. In certain examples, the fiber holder 252 can include a one-piece body. For example, the fiber holder 252 can be a single unitary piece made by a molding process. In other examples, the cover 254 may include two pieces. In certain examples, the two pieces of the cover can be connected together via a living hinge. Various fiber holders are disclosed by U.S. Provisional Application Ser. No. 63/071,779, filed Aug. 28, 2020; and U.S. Provisional Application Ser. No. 63/104,646, filed Oct. 23, 2020; both entitled "LOW PROFILE FIBER HOLDERS FOR USE WITH BARE FIBER MULTI-FIBER FIBER OPTIC CONNECTORS", and which are hereby incorporated by reference in their entireties.

The first plurality of optical fibers 230*a* routed through the first multi-fiber fiber optic connector 212 can be anchored to the base 256 of the fiber holder 252. The base 256 of the fiber holder 252 may have fiber positioning grooves 258 for receiving the first plurality of optical fibers 230*a*. In certain examples, the fiber positioning grooves 258 can be V-shaped grooves and/or U-shaped grooves, although alternatives are possible.

In certain examples, the cover 254 of the fiber holder 252 can include at least one epoxy injection port 260. Epoxy can be injected into the least one epoxy injection port 260 to anchor the first plurality of optical fibers 230*a* within the fiber holder 252. By bonding the first plurality of optical fibers 230*a*, the first plurality of optical fibers 230*a* can be held in an aligned position.

The connector body 222 may also include rear outboard springs 262 for biasing the fiber holder 252 in a forward direction. The rear outboard springs 262 can be captured between the rear piece connector body 228 and the fiber holder 252. The rear piece connector body 228 defines an opening 228*a* for routing the first plurality of optical fibers therethrough.

The bare fiber connection system 210 can also include a retractable shroud (e.g., nose piece) 264 that mounts at the front end 224 of the connector body 222. The retractable shroud 264 can be moveable along the longitudinal axis relative to the connector body 222 between a forward position (e.g., extended position) (see FIG. 4) and a rearward position (e.g., retracted position) (see FIG. 8). The retractable shroud 264 defines a plurality of fiber passages 266 (see FIG. 11) through which the plurality of optical fibers 230*a* extend. When the retractable shroud 264 is in the rearward position, the fiber ends 232 of the first plurality of optical fibers 230*a* project forwardly beyond the retractable shroud 264. When the retractable shroud 264 is in the forward position, the fiber ends 232 are protected within the retractable shroud 264.

The connector body 222 further includes a first front latch 268 that extends from the first minor side 238 of the connector body 222 and a second front latch 270 that extends from the second minor side 240 of the connector body 222 for securing the retractable shroud 264 to the connector body 222. In certain examples, grooves 272 can be defined in the first and second front latches 268, 270. The grooves 272 may be defined on inside surfaces 274 of the first and second front latches 268, 270 in alternative embodiments, but as depicted at FIG. 9, the grooves 272 are defined at outside surfaces 276 of the first and second front latches 268, 270.

Still referring to FIG. 9, a first outboard spring 278 of the first multi-fiber fiber optic connector 212 may be positioned adjacent to the first minor side 238 of the connector body 222 and a second outboard spring 280 may be positioned adjacent to the second minor side 240 of the connector body 222. The first and second outboard springs 278, 280 are positioned on the first and second minor sides 238, 240 of the connector body 222 to reduce the overall height and provide a low profile system. The first and second outboard springs 278, 280 can be mounted in either the inside surface 274 of the first and second front latches 268, 270 or the outside surface 276 of the first and second front latches 268, 270.

The first and second outboard springs 278, 280 may be configured to bias the retractable shroud 264 to the forward position relative to the connector body 222. The first and second outboard springs 278, 280 can have lengths that extend along the longitudinal axis of the first multi-fiber fiber optic connector 212. The grooves 272 of the first and second front latches 268, 270 can be configured to receive the first and second outboard springs 278, 280. The first and second outboard springs 278, 280 can be respectively supported at one end thereof by a pin 282 positioned on opposing sides of the connector body 222.

Figure 12:
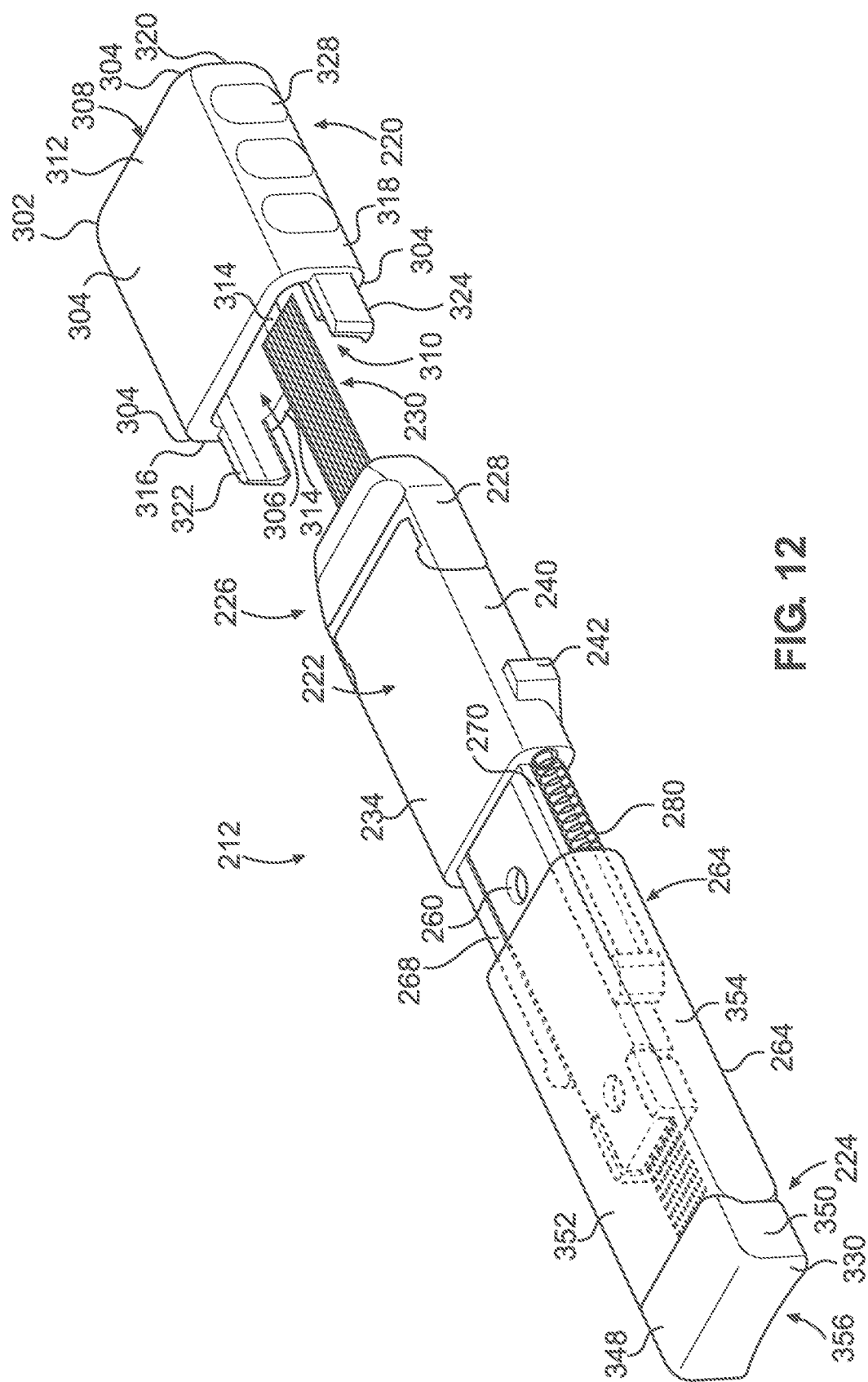
FIG. 12 illustrates a perspective view of the first multi-fiber fiber optic connector of FIG. 5 with a release key in accordance with the principles of the present disclosure.
Figure 17:
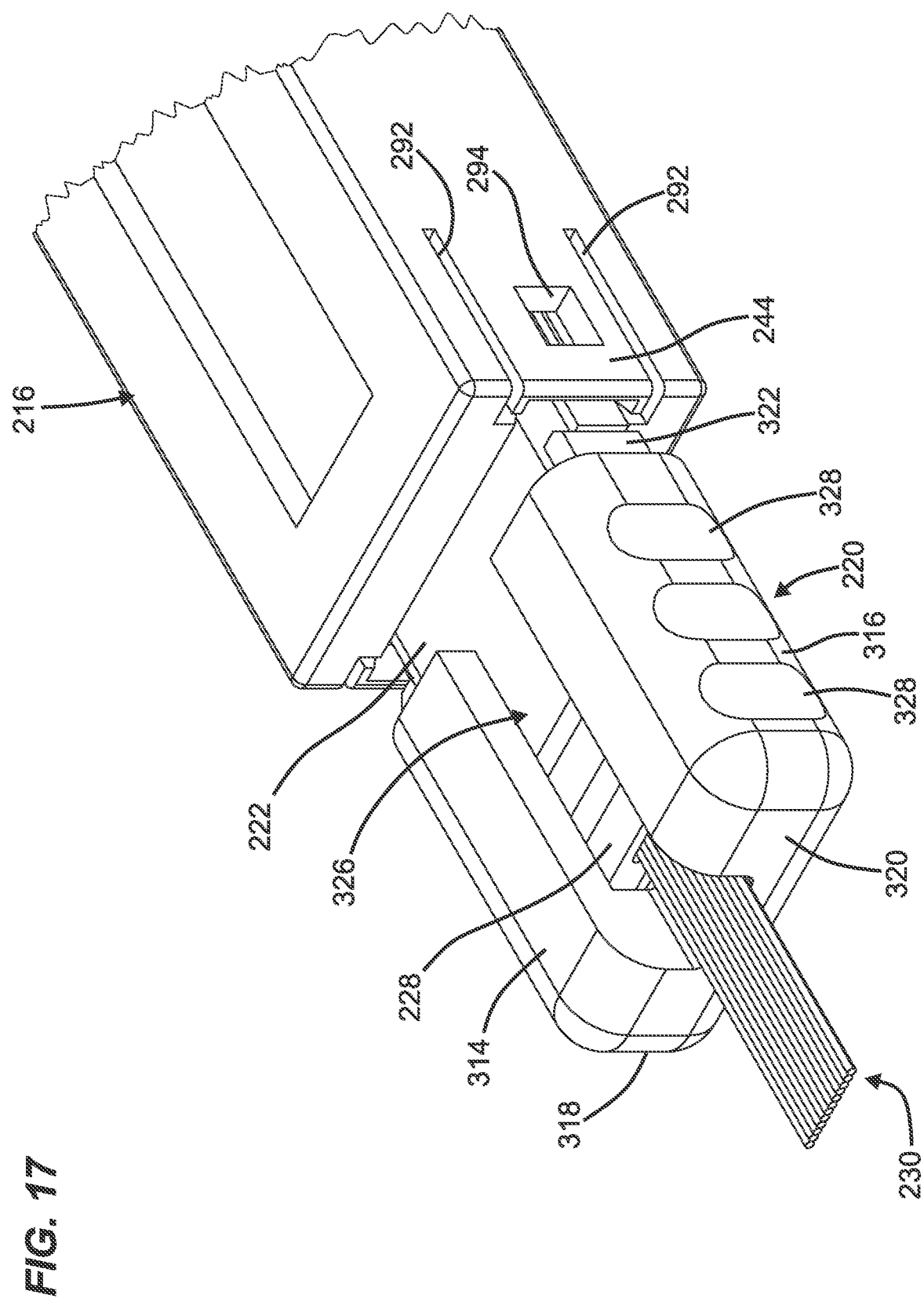
FIG. 17 illustrates an enlarged perspective view of the release key prior to being installed on the first multi-fiber fiber optic connector.
Figure 18:
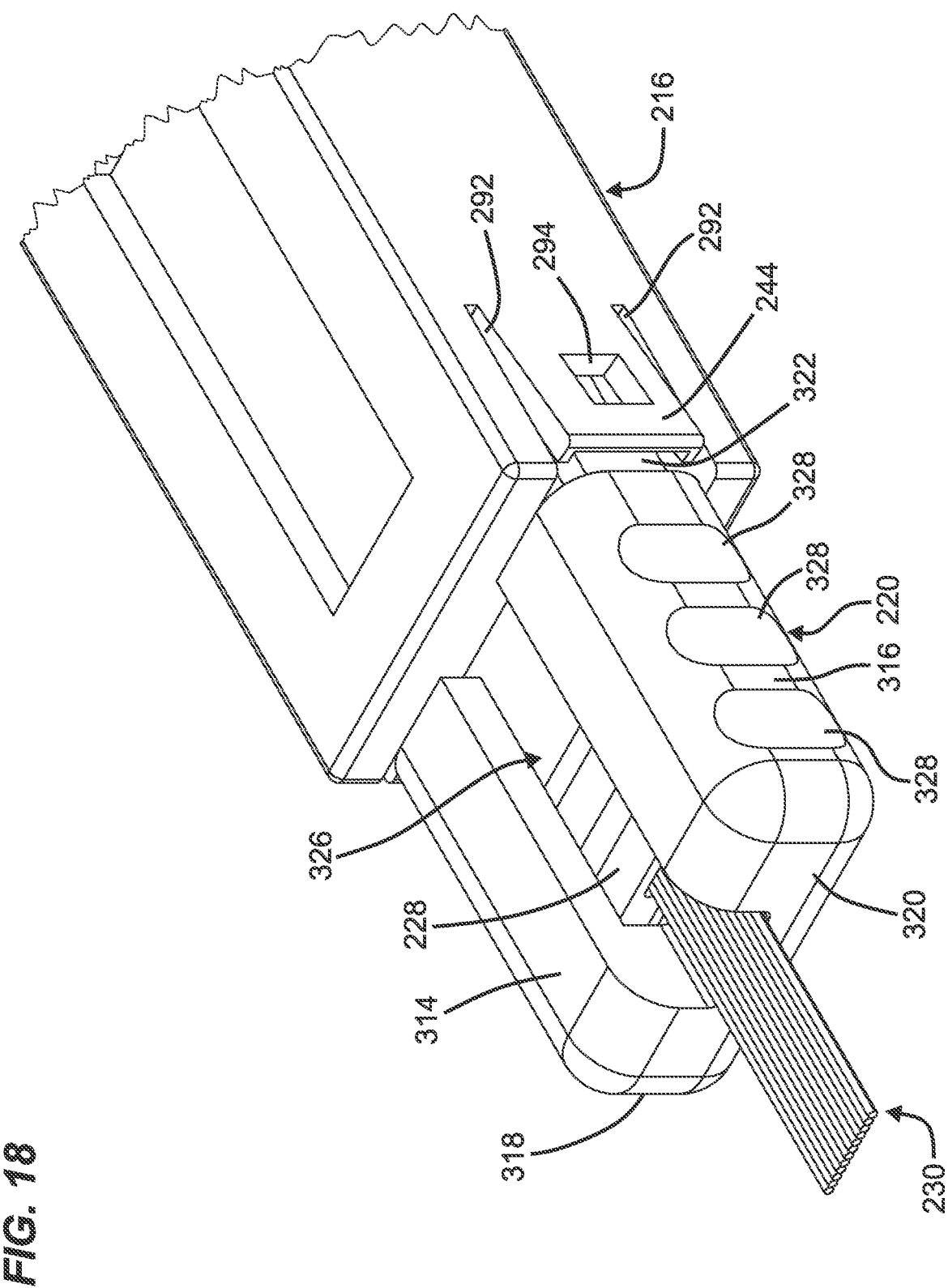
FIG. 18 illustrates an enlarged perspective view of the release key installed on the first multi-fiber fiber optic connector.
Figure 19:
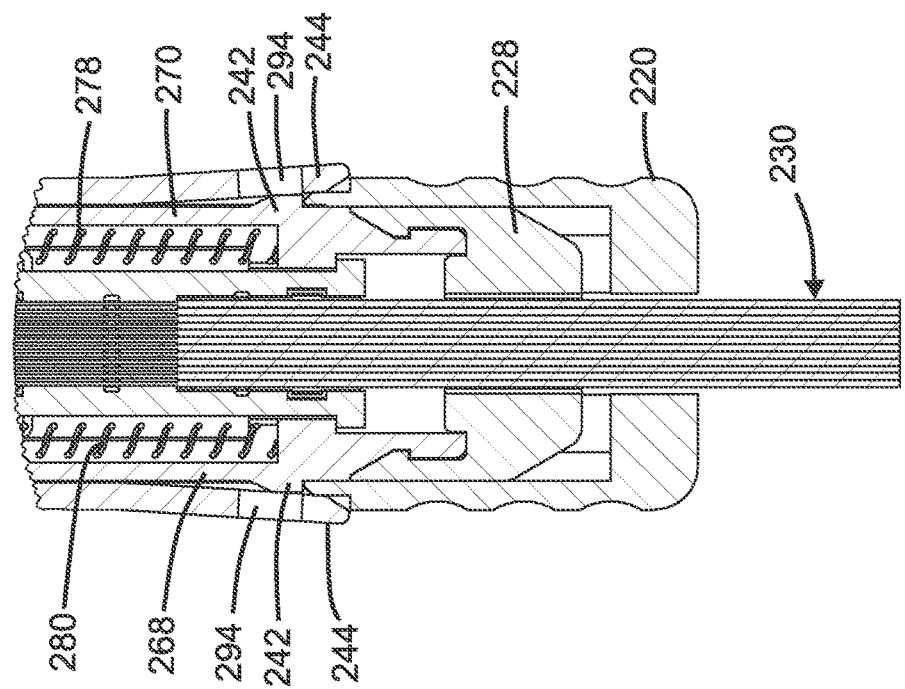
FIG. 19 illustrates a cross-sectional top view of FIG. 17.
Figure 20:
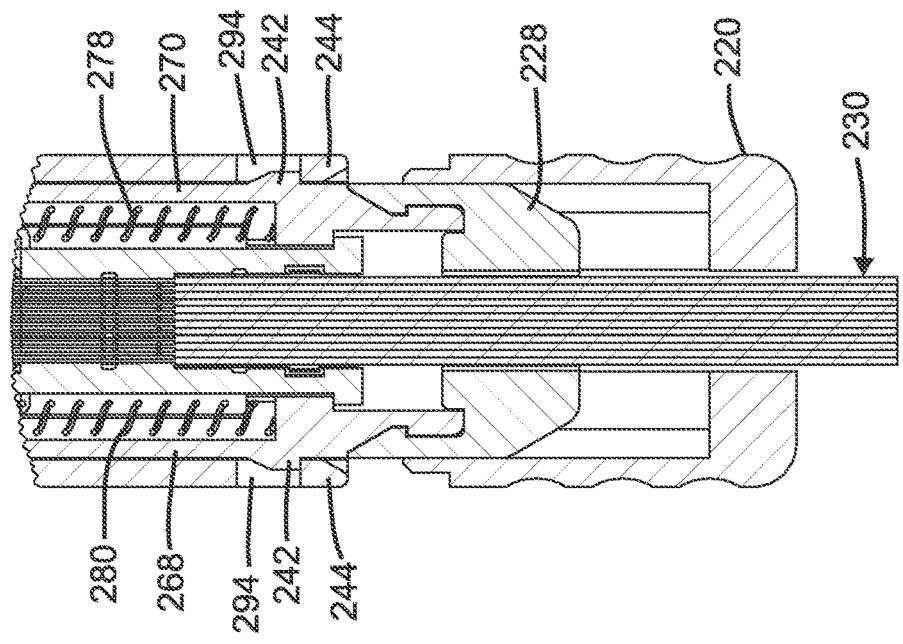
FIG. 20 illustrates a cross-sectional top view of FIG. 18.

In certain examples, the fiber holder 252 can be positioned between the first and second outboard springs 278, 280. In certain examples, the retractable shroud 264 is configured to be mounted over the first and second front latches 268, 270 of the connector body 222. In other examples, a retractable shroud is configured to be mounted between latches of a connector body as shown in FIGS. 12-13. In certain examples, the retractable shroud 264 is configured to mount over the first and second outboard springs 278, 280 and the fiber holder 252, although alternatives are possible.

Turning again to FIGS. 1-2, the multi-fiber adapter 216 includes a first major adapter side 284 (e.g., top), an opposite, second major adapter side 286 (e.g., bottom), a first minor adapter side 288, and an opposite, second minor adapter side 290. In certain examples, the latches 244 can be defined by slots 292 provided on at least one of the first and second minor adapter sides 288, 290 of the multi-fiber adapter 216, although alternatives are possible. The latches 244 of the multi-fiber adapter 216 can each define an aperture 294 configured to receive the fixed catch 242 of the first and second multi-fiber fiber optic connectors 212, 214 when the first and second multi-fiber fiber optic connectors 212, 214 are mounted into the first and second adapter ports 246, 248, respectively.

It will be appreciated that the multi-fiber adapter 216 is configured to receive optical fibers that are not supported by or secured within a ferrule. The fiber passages 266 of the retractable shroud 264 can be arranged and configured to align with the multiple fiber alignment grooves 296 of the groove-defining piece 250 upon insertion of the first multi-fiber fiber optic connector 212 into the first adapter port 246 of the multi-fiber adapter 216. The multiple fiber alignment grooves 296 of the groove-defining piece 250 can extend along a fiber insertion axis 300 to receive the fiber ends 232 of the plurality of optical fibers 230 projecting forwardly beyond the retractable shroud 264. The multiple fiber alignment grooves 296 can be v-grooves or other shaped grooves (e.g., half circles, U-shaped grooves, etc.). It will be appreciated that other types of bare fiber alignment devices may be alternatively used with the multi-fiber adapter 216.

As the first multi-fiber fiber optic connecter 212 is inserted into the first adapter port 246, the retractable shroud 264 can retract relative to the connector body 222. When the retractable shroud 264 is in the rearward position, the plurality of optical fibers 230a can project from the fiber passages 266 of the retractable shroud 264 into the multiple fiber alignment grooves 296 of the groove-defining piece 250. The same can be true of the second multi-fiber fiber optic connector 214 such that the first and second plurality of optical fibers 230a, 230b can be optically coupled together.

Turning to FIGS. 10-11, the optical fibers 230a are shown in place within the fiber holder 252 of the first multi-fiber fiber optic connector 212 and the retractable shroud 264. The optical fibers 230a may be spaced apart to define a gap between each optical fiber 230a making a pitch (i.e., center to center spacing). Example pitches include 250 micrometers and 200 micrometers. The fiber holder 252 can establish a distance from a point on one optical fiber to a corresponding point on an adjacent optical fiber as measured across a horizontal axis between adjacent optical fibers in the fiber holder 252. The fiber holder 252 can locate the individual optical fibers 230a in an x-dimension (e.g., along the W of the connector body 222), in a y-dimension (e.g., along the height H of the connector body 222) and can control an exit angle of the fiber ends 232 projecting from the fiber holder 252 in a z-dimension (e.g., along the lengths of the optical fibers 230a and a length L of the fiber holder 252).

Referring to FIGS. 12-16, the release key 220 of the bare fiber connection system 210 is shown prior to being mounted. The release key 220 is mountable at the rear end 226 of the connector body 222 to release the first and second multi-fiber fiber optic connectors 212, 214 from the first and second adapter ports 246, 248 of the multi-fiber adapter 216.

The release key 220 includes a housing 302 with a plurality of walls 304 that define a receptacle (e.g., cavity) 306 for receiving the rear piece connector body 228 of the connector body 222. The receptacle 306 may have a closed end 308 and an opposite, open end 310 such that the rear piece connector body 228 can be received into the receptacle 306 through the open end 310.

The plurality of walls 304 of the release key 220 may include a first key major side wall (e.g., top side) 312, an opposite, second key major side wall (e.g., bottom side) 314, a first key minor side wall 316, an opposite, second key minor side wall 318, and an end wall 320. The end wall 320 may extend between the first and second key minor side walls 316, 318 to form the closed end 308 of the receptacle 306. The receptacle 306 of the release key 220 is configured to receive the rear piece connector body 228 of the connector body 222.

The release key 220 includes a first extension member 322 positioned on the first key minor side wall 316 of the housing 302 and a second extension member 324 positioned on the second key minor side wall 318 of the housing 302. As such, the first and second extension members 322, 324 are configured to extend longitudinally from opposing sides of the housing 302 of the release key 220.

Turning to FIGS. 17-20, when the release key 220 is mounted over the rear piece connector body 228 of the connector body 222, the first and second extension members 322, 324 of the release key 220 can engage the latching arrangement 218 such that the latches 244 of the multi-fiber adapter 216 are flexed away from the fixed catches 242 of the connector body 222 to allow the first and second multi-fiber fiber optic connectors 212, 214 to be released from the first and second adapter ports 246, 248 of the multi-fiber adapter 216. The release key 220 is not intended to remain mounted at the rear end 226 of the connector body 222, but rather is designed to be used as a separate tool to release the first and second multi-fiber fiber optic connectors 212, 214 from the first and second adapter ports 246, 248 of the multi-fiber adapter 216.

In certain examples, the second key major side wall 314 of the housing 302 of the release key 220 and the end wall 320 of the housing 302 of the release key 220 define a slot 326. The slot 326 can extend from the end wall 320 to the open end 310 of the housing 302 between the first and second key minor side walls 316, 318. The slot 326 allows the release key 220 to fit over the plurality of optical fibers 230 extending from the rear end 226 of the connector body 222. The slot 326 allows the release key 220 to be inserted over the plurality of optical fibers 230 at a location behind the first and second multi-fiber fiber optic connectors 212, 214, respectively, and then slid longitudinally over the rear end 226 of the connector body 222 to release the latches 244 of the multi-fiber adapter 216. The release key 220 can be mounted at the rear end 226 of the connector body 222 with the slot 326 facing up away from the connector body 222 or facing down toward the connector body 222.

In certain examples, the first and second key minor side walls 316, 318 of the housing 302 of the release key 220 can include a textured surface 328 for ease of gripping the release key 220. The first and second multi-fiber fiber optic connectors 212, 214 can also be rendered tamper-proof without the release key 220.

Turning again to FIGS. 9-11, the bare fiber connection system 210 further includes an example dust cap 330 that mounts over the retractable shroud 264. The dust cap 330 is adapted to seal the retractable shroud 264 and thereby shield it from contamination. The example dust cap 330 stops against the retractable shroud 264 when installed. That is, the dust cap 330 includes an inclined surface 332 that contacts a ramped surface 334 of the retractable shroud 264 when the dust cap 330 is installed over the retractable shroud 264. The example dust cap 330 includes a cavity 336 that is positioned over the retractable shroud 264 when installed and thereby protects polished ends of the fiber ends 232.

The dust cap 330 extends between a front end 338 and a rear end 340. The dust cap 330 includes a sleeve 342 having a closed end 344 and an open end 346. The cavity 336 is formed within the sleeve 342. The dust cap 20 can include broad sides (i.e., major sides) 348 and narrow sides (i.e., minor sides) 350 that generally align with major shroud sides 352 and minor shroud sides 354 of the retractable shroud 264 respectively. The dust cap 330 can have a contouring shape 356 (see FIG. 7) on one of the broad sides 348 matching that of a fiber optic cable. That is, the dust cap 330 can be curved along a dimension that extends along major dimensions of the first and second major sides 234, 236 of the connector body 222. In certain examples, the contoured shape can be added to the connector body 222.

At least one resilient latch 360 can be provided on at least one of the broad sides 348 of the dust cap 330. The at least one resilient latch 360 can extend in a direction from the open end 346 of the sleeve 342 of the dust cap 330. In certain examples, the at least one resilient latch 360 is integrally formed with the sleeve 342 of the dust cap 330, although alternatives are possible. The at least one resilient latch 360 includes a projection 362 that is configured to engage an opening 364 defined in one of the major shroud sides 352 of the retractable shroud 264 to form a snap-fit connection between the dust cap 330 and the retractable shroud 264. As such, the at least one resilient latch 360 releasably latches the dust cap 330 on the retractable shroud 264.

When the dust cap 330 is mounted on the retractable shroud 264, the projection 362 of the at least one resilient latch 360 extends through the opening 364 and opposes a front end of the fiber holder 252 to prevent the retractable shroud 264 from moving from the forward position to the rearward position relative to the connector body 222. As such, the least one resilient latch 360 can function as a stop to lock the retractable shroud 264 relative to the connector body 222.

In certain examples, a locking feature can be added over the exposed first and second outboard springs 278, 280 to lock the retractable shroud 264 relative to the connector body 222.

Figure 21:
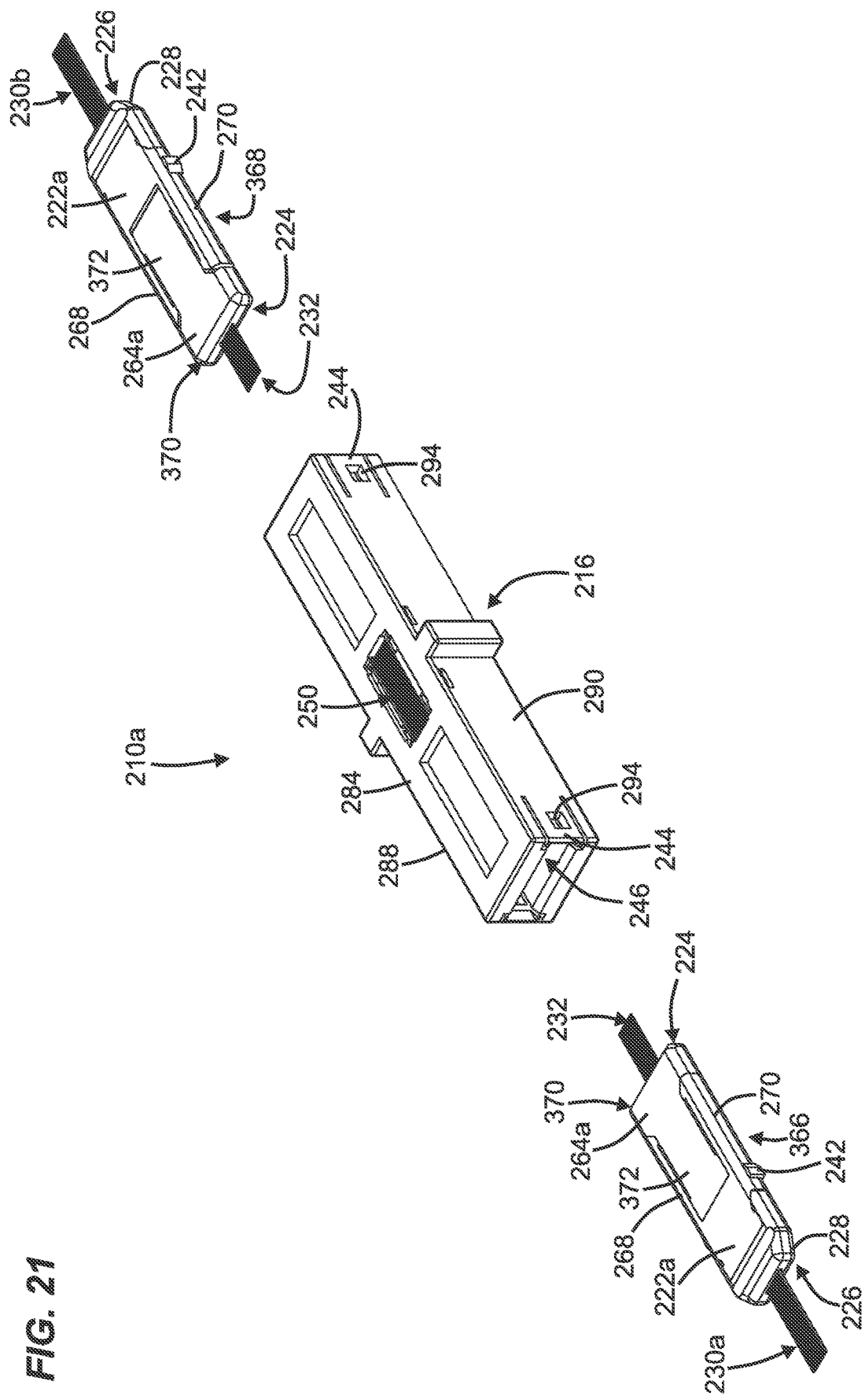
FIG. 21 illustrates a perspective view of an alternative bare fiber connection system in accordance with the principles of the present disclosure with another multi-fiber fiber optic connectors and the multi-fiber adapter of FIG. 1.
Figure 22:
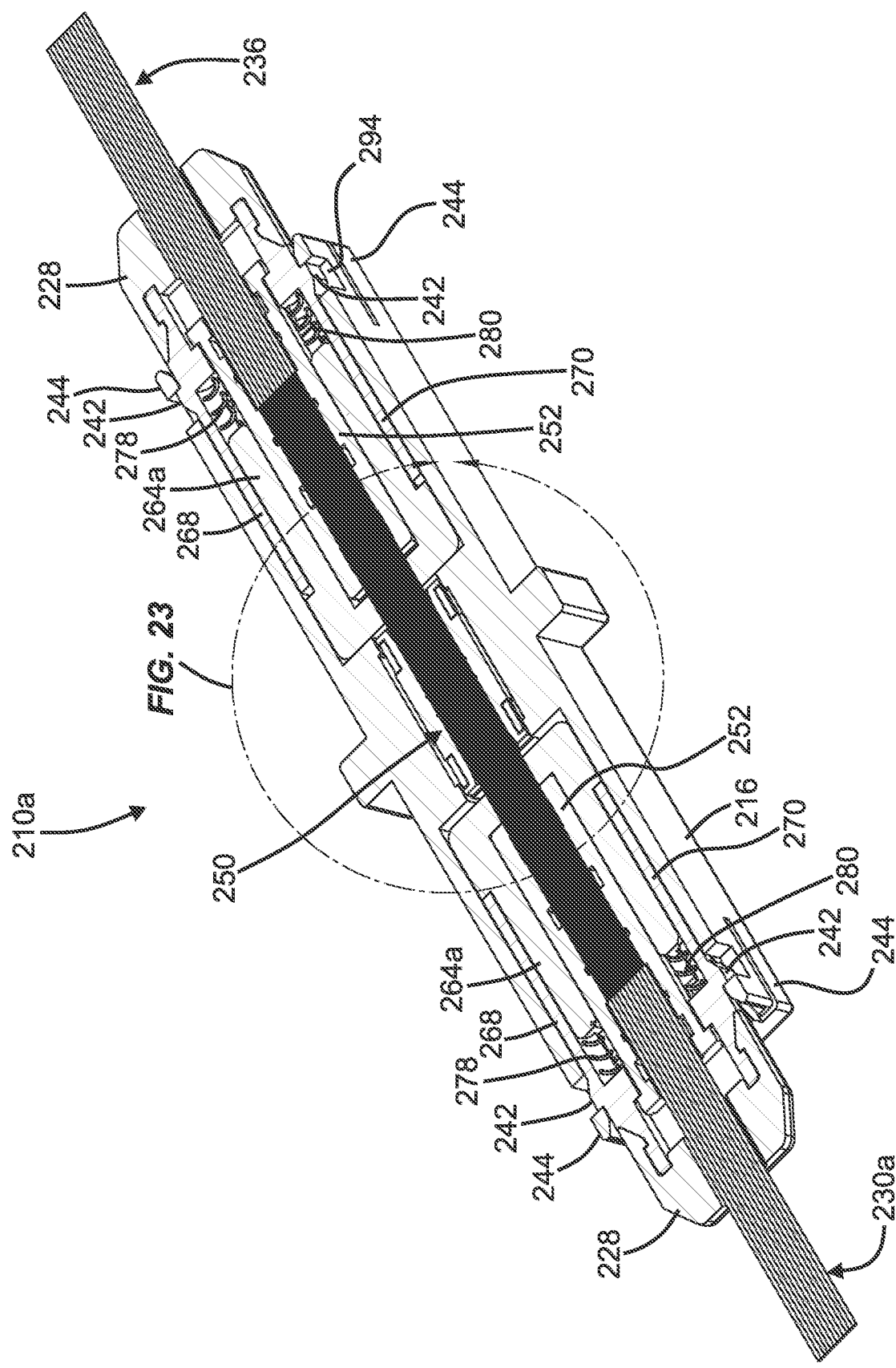
FIG. 22 is a cross-sectional view of the bare fiber connection system of FIG. 21 with the multi-fiber fiber optic connectors mounted in the multi-fiber adapter.
Figure 23:
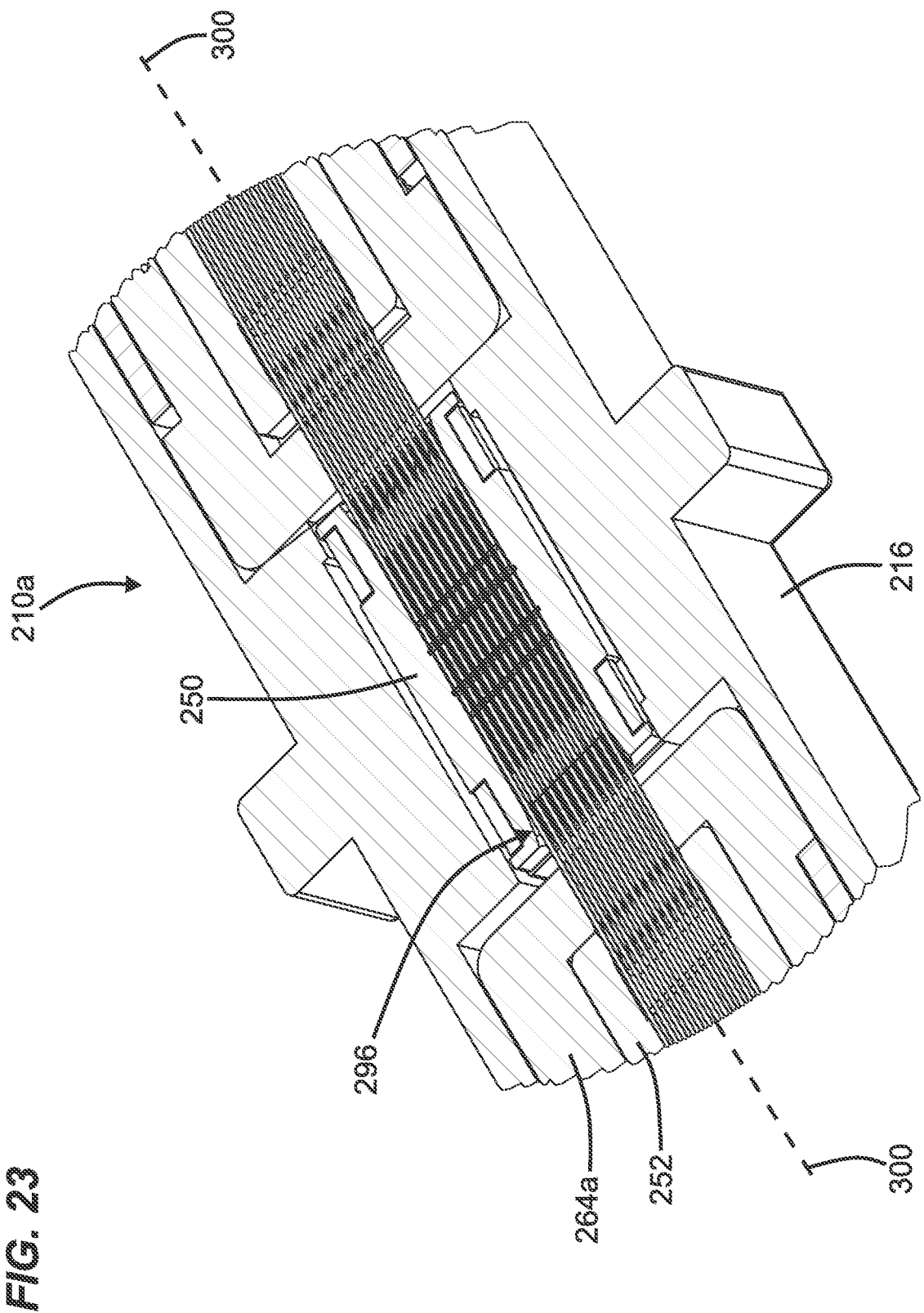
FIG. 23 is an enlarged view of a portion of the bare fiber connection system of FIG. 22.

Referring to FIGS. 21-23, an alternative bare fiber connection system 210a is depicted in accordance with the principles of the present disclosure. The bare fiber connection system 210a includes first and second multi-fiber fiber optic connectors 366, 368 that function similar to the first and second multi-fiber fiber optic connectors 212, 214 previously described except for retractable shroud 264a.

The bare fiber connection system 210a can include the multi-fiber adapter 216 described above. The latches 244 of the multi-fiber adapter 216 are adapted to interface with the fixed catches 242 of the first and second multi-fiber fiber optic connectors 366, 368 when the first and second multi-fiber fiber optic connectors 366, 368 are inserted into the first and second adapter ports 246, 248. The multiple fiber alignment grooves 296 of the groove-defining piece 250 of the multi-fiber adapter 216 receives the fiber ends 232 of the plurality of optical fibers 230 for co-axially aligning the optical fibers 230a, 230b of the first and second multi-fiber fiber optic connectors 366, 368 to provide an optical connection therebetween.

The first and second multi-fiber fiber optic connectors 366, 368 are similar to the first and second multi-fiber fiber optic connectors 212, 214 previously described except the retractable shroud 264a is designed to mount between first and second front latches 268a, 270a of connector body 222a of the first and second multi-fiber fiber optic connectors 366, 368.

Figure 24:
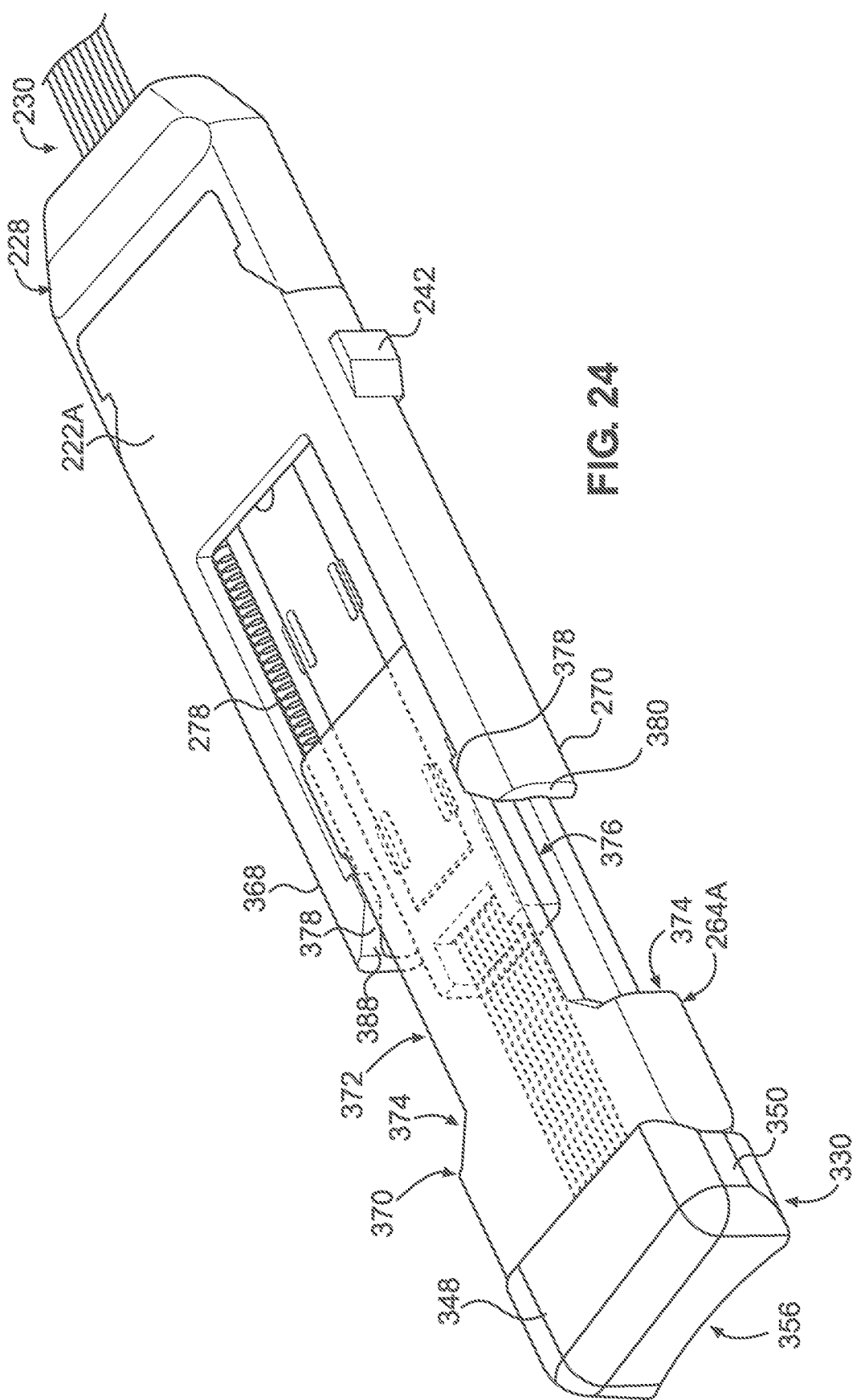
FIG. 24 is a perspective view of the multi-fiber fiber optic connector of FIG. 21 showing another shroud in an extended position with a dust cap.
Figure 25:
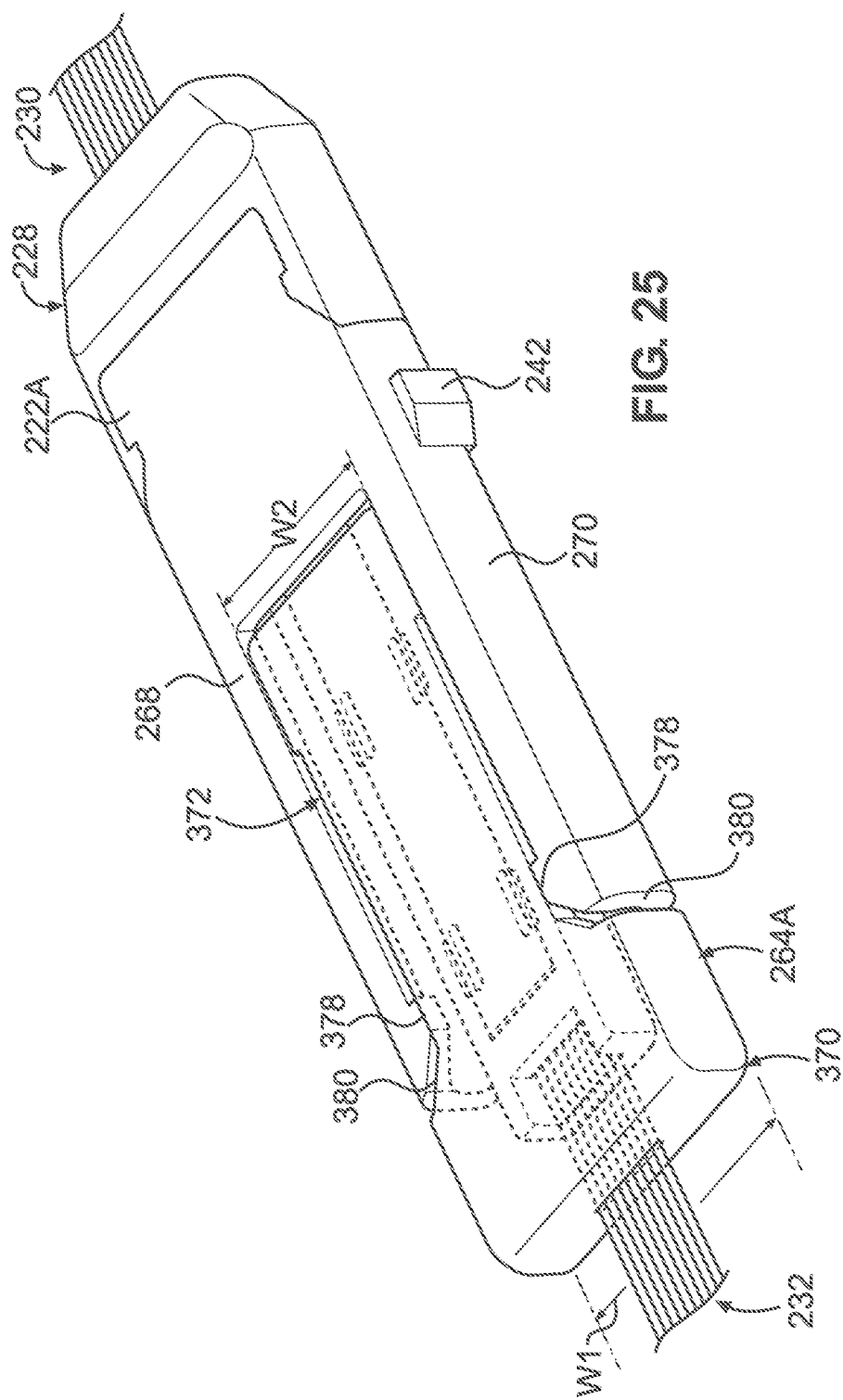
FIG. 25 illustrates a perspective view of the multi-fiber fiber optic connector of FIG. 24 showing the shroud in a retracted position with the dust cap removed.

Referring to FIGS. 24-25, the retractable shroud 264a includes a head portion 370 and a main body portion 372. A tapered section 374 is provided between the head portion 370 and the main body portion 372 such that the main body portion 372 extends from the tapered section 374 such that a width $W_1$ of the head portion 370 is greater than a width $W_2$ of the main body portion 372. The main body portion 372 includes a coupling element 376 on opposing sides of the retractable shroud 264a for coupling with the connector body 222a. The coupling element 376 can be formed as recesses, such as notches or grooves, or rail members designed to releasably interlock with corresponding features of the connector body 222a. The first and second front latches 268a, 270a of the connector body 222a can each include a retention element 378 that can be attached to the coupling element 376 to interconnect the retractable shroud 264a with the connector body 222a.

When the retractable shroud 264a is mounted at the front end 224 of the connector body 222a, the main body portion 372 of the retractable should 264a can be inserted between the first and second front latches 268a, 270a of the connector body 222a such that the retention elements 378 engage the coupling element 376 and the tapered section 374 of the retractable shroud 264a mates with a corresponding tapered section 380 of the connector body 222a when the retractable shroud 264a is fully retracted.

The retractable shroud 264a can be moveable along the longitudinal axis X relative to the connector body 222a between a forward position (see FIG. 24) and a rearward position (see FIG. 25). The fiber ends 232 of the optical fibers 230 project forwardly beyond the retractable shroud 264a when the retractable shroud 264a is in the rearward position, and the fiber ends 232 are protected within the retractable shroud 264a when the retractable shroud 264a is in the forward position.

The first and second outboard springs 278, 280 are respectively positioned between the first and second front latches 268a, 270a of the connector body 222a and the fiber holder 252. The first outboard spring 278 is adjacent the first minor side 238 of the connector body 222a and the second outboard spring 280 is positioned adjacent the second minor side 240 of the connector body 222a. The fiber holder 252 can be positioned between the first and second outboard springs 278, 280. The first and second outboard springs 278, 280 bias the retractable shroud 264a to the forward position relative to the connector body 222a. When the retractable shroud 264a is mounted to the connector body 222a, the main body portion 372 of the retractable shroud 264a mounts between the first and second front latches 268a, 270a of the connector body 222a and over the fiber holder 252 and the first and second outboard springs 278, 280. That is, the retractable shroud 264a is not mounted over the first and second front latches 268a, 270a or the connector body 222a.

Figure 26:
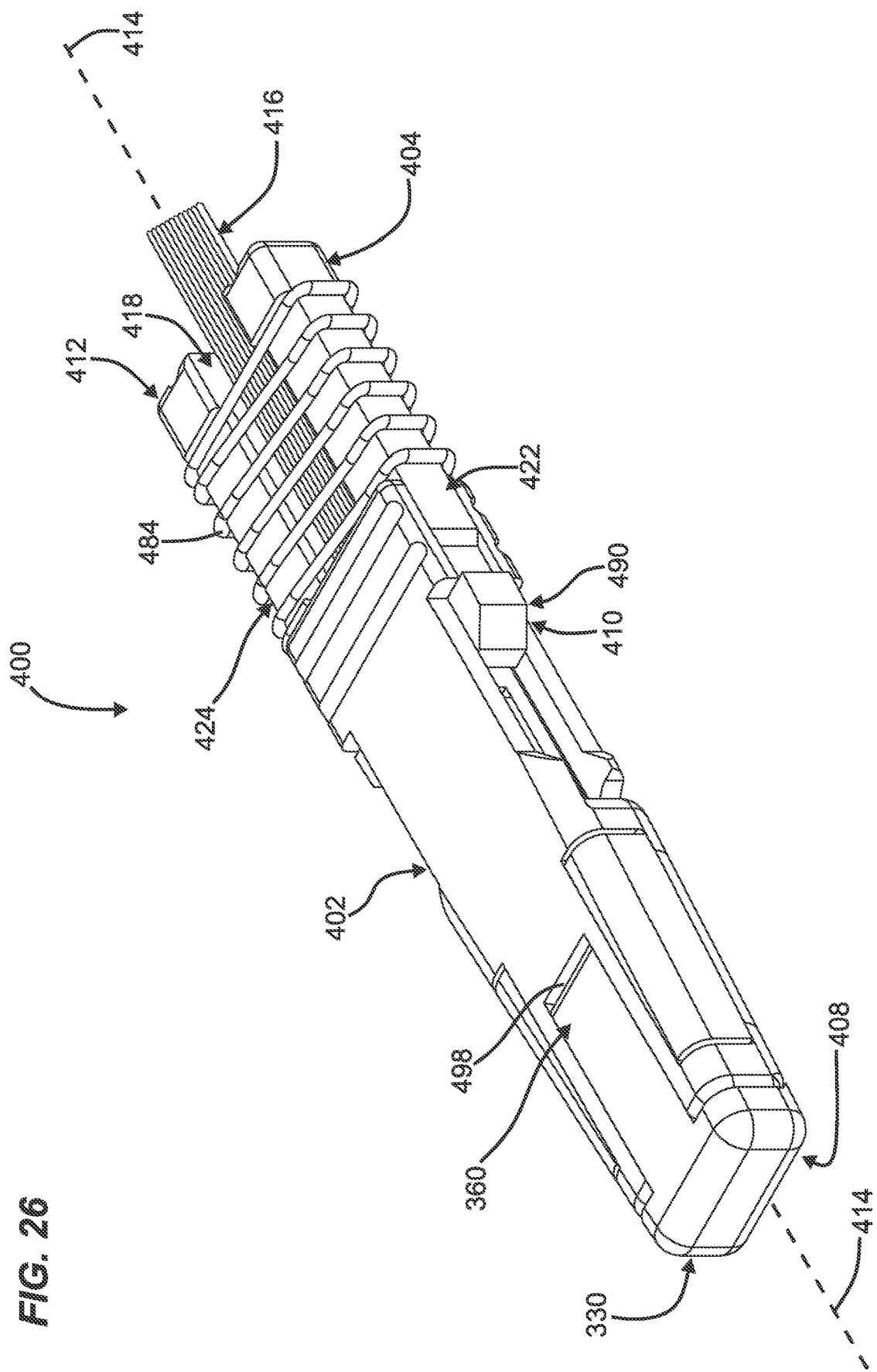
FIG. 26 illustrates a bottom perspective view of an alternative multi-fiber fiber optic connector including a shroud and dust cap in accordance with the principles of the present disclosure.
Figure 27:
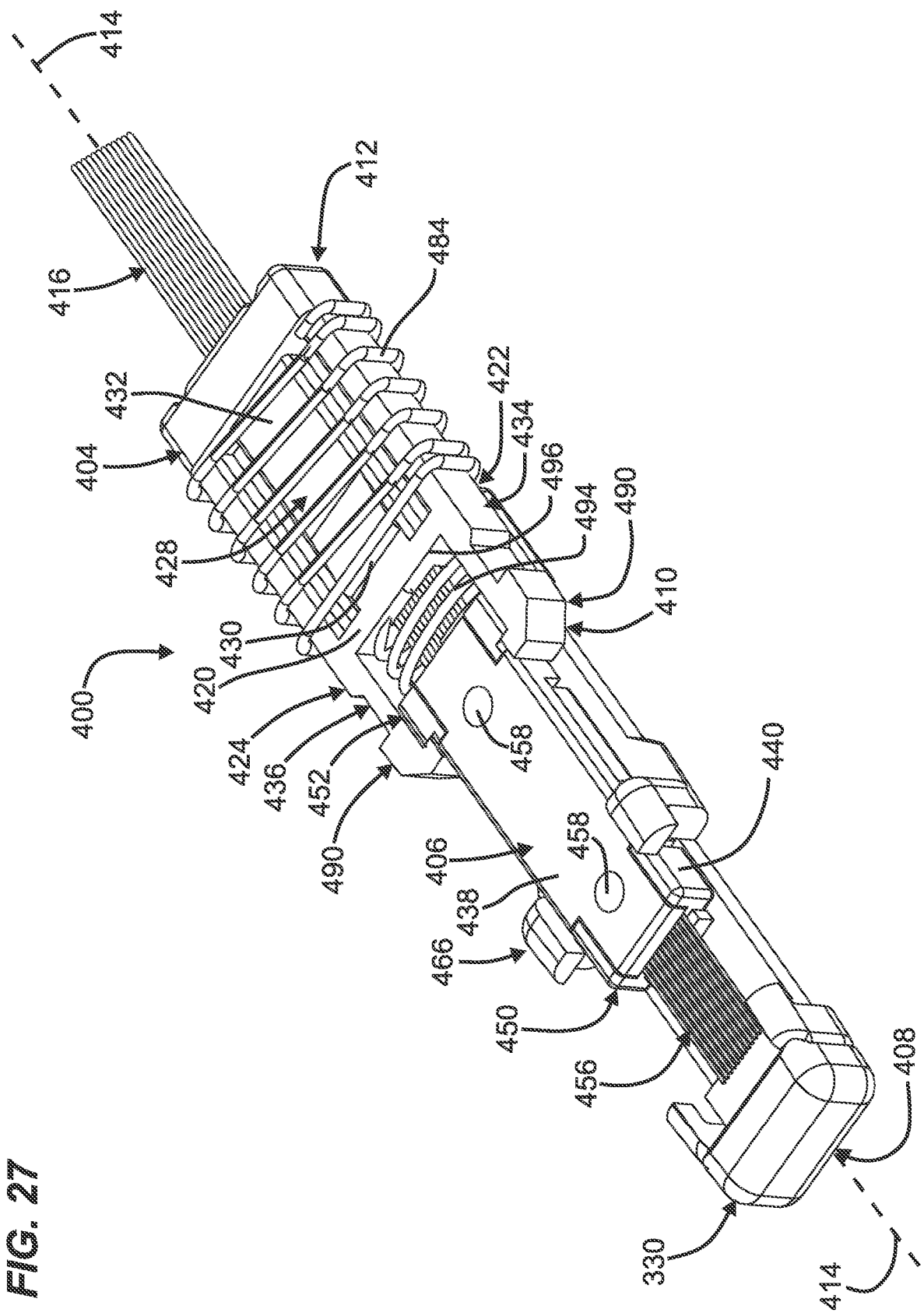
FIG. 27 illustrates a top perspective view of the multi-fiber fiber optic connector of FIG. 26 showing a top piece of the shroud removed.

FIGS. 26-27 illustrate an alternative multi-fiber fiber optic connector 400 in accordance with the principles of the present disclosure. The multi-fiber fiber optic connector 400 is a bare fiber multi-fiber fiber optic connector. The multi-fiber fiber optic connector 400 includes a shroud 402, a connector body 404, a fiber holder 406, and a dust cap 408. The dust cap 408 can have a similar configuration as the dust cap 330 described above.

The connector body 404 has a front end 410 and a rear end 412. The connector body 404 defines a longitudinal axis 414 that extends through the connector body 404 in an orientation that extends from the front end 410 to the rear end 412 of the connector body 404. The multi-fiber fiber optic connector 400 includes a plurality of optical fibers 416. The connector body 404 defines a channel 418 (see FIG. 30) for routing the plurality of optical fibers 416 therethrough. That is, the plurality of optical fibers 416 can extend through the channel 418 of the connector body 404 from the rear end 412 to the front end 410. In certain examples, the plurality of optical fibers 416 may be ribbonized, buffered, or otherwise contained within a passage of an outer jacket.

The connector body 404 includes a bridge portion 420 that extends between a first minor side 422 and an opposite, second minor side 424 of the connector body 404 and a spring stop 426 is positioned at the rear end 412 of the connector body 404. The connector 404 can also include a center member 428 that extends from the bridge portion 420 toward the rear end 412 to engage the spring stop 426. The center member 428 has a flange portion 430 that extends from atop surface 432 thereof. The flange portion 430 can act as a stop for the shroud 402. The connector body 404 further includes a first front latch 434 that extends forwardly from the bridge portion 420 of the connector body 404 adjacent the first minor side 422 of the connector body 404 and a second front latch 436 that extends forwardly from the bridge portion 420 of the connector body 404 adjacent the second minor side 424 of the connector body 404.

The fiber holder 406 of the multi-fiber fiber optic connector 400 includes a cover 438 and a base 440. The cover 438 has latches 442 to provide a snap-fit connection with the base 440, although alternatives are possible. In certain examples, the cover 438 can be mounted to the base 440 via a press-fit connection or a pivotal connection. In certain examples, the fiber holder 406 can include a one-piece body. The base 440 can be molded with inserts to form cutout areas 444 in first and second side walls 446, 448 of the base 440.

Figure 28:
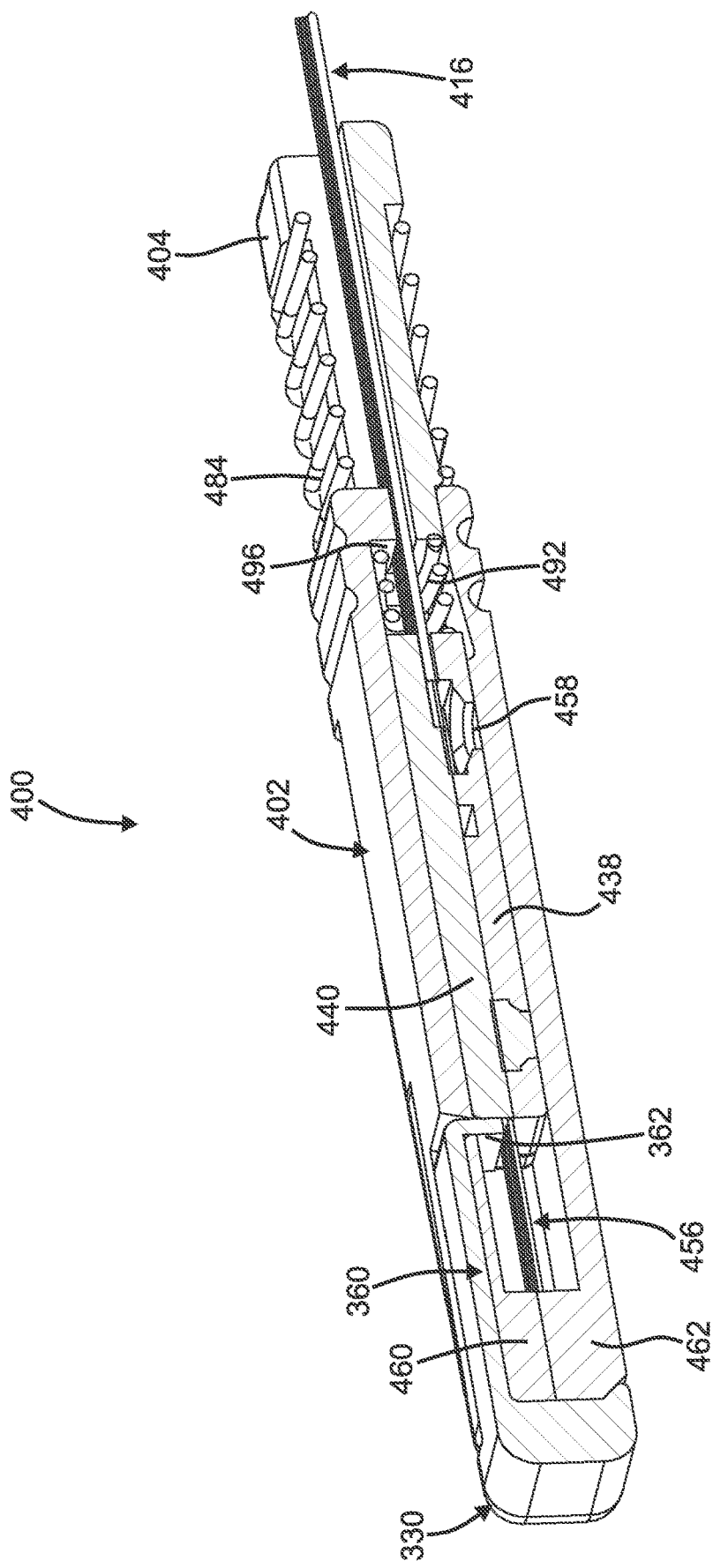
FIG. 28 illustrates a cross-sectional view of the multi-fiber fiber optic connector of FIG. 26.
Figure 29:
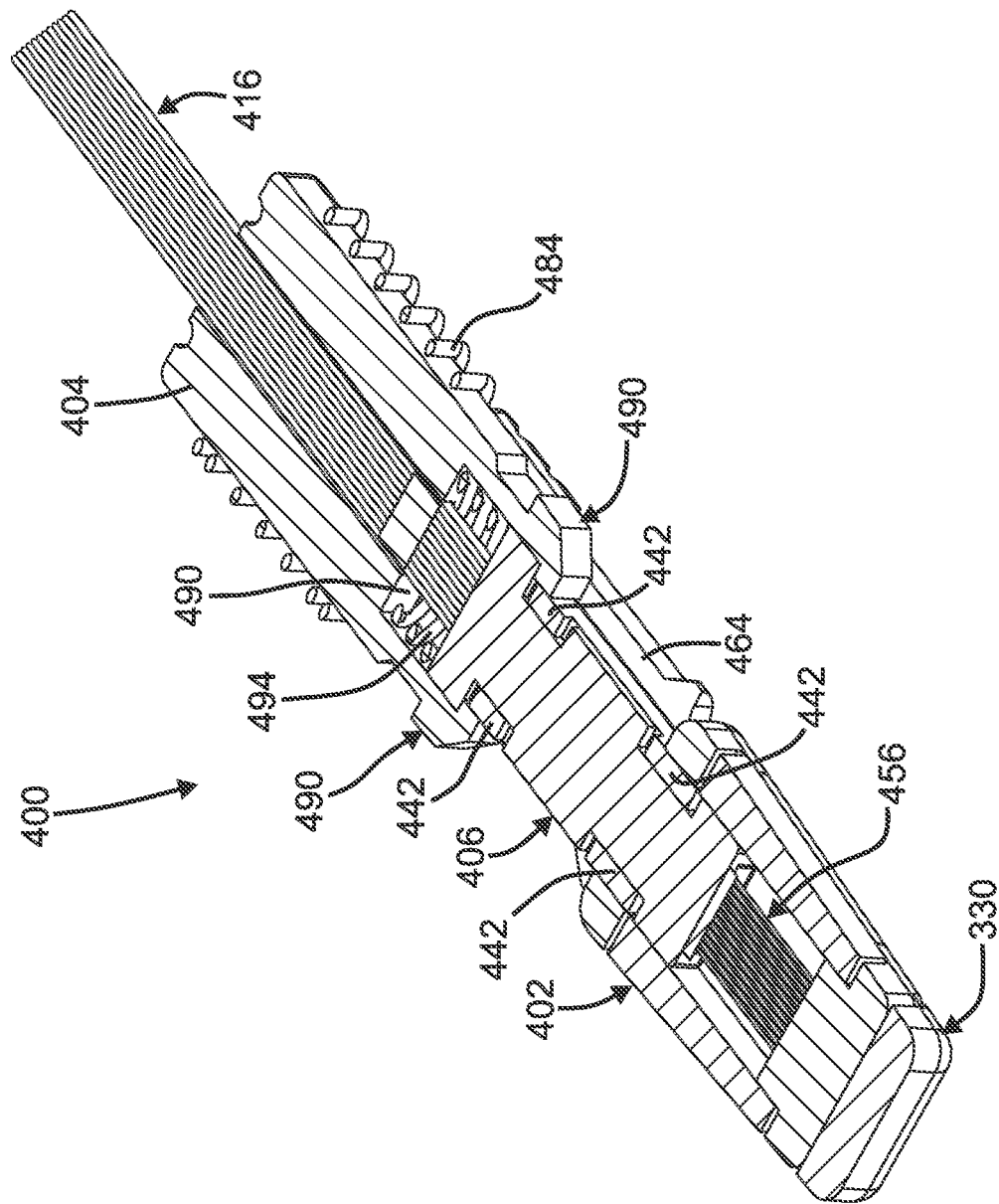
FIG. 29 illustrates another cross-sectional view of the multi-fiber fiber optic connector of FIG. 26.
Figure 30:
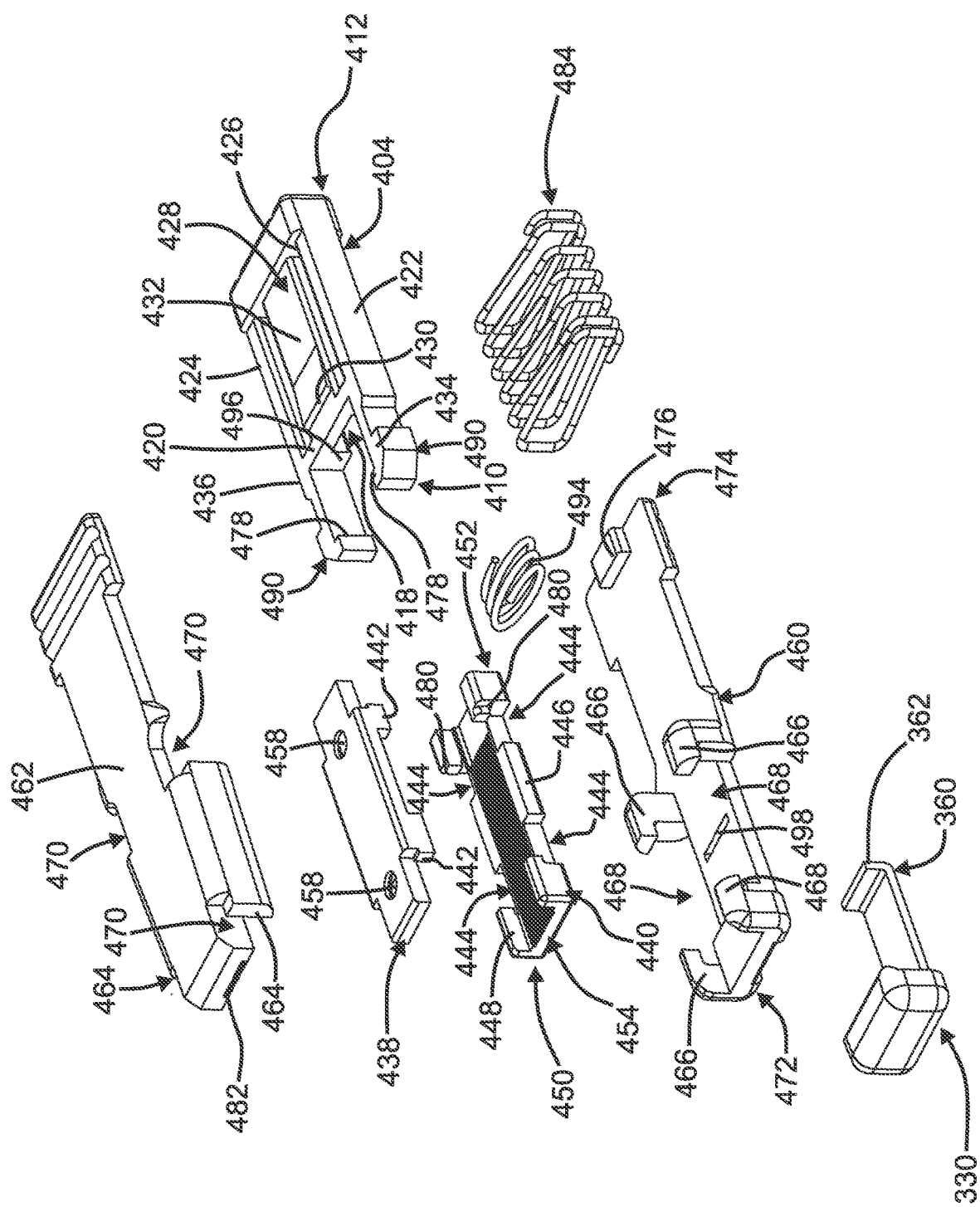
FIG. 30 illustrates an exploded view of the multi-fiber fiber optic connector of FIG. 26.

Turning to FIGS. 28-30, the fiber holder 406 includes a first end 450 and an opposite, second end 452. The plurality of optical fibers 416 are routed through the fiber holder 406 from the second end 452 to the first end 450. The plurality of optical fibers 416 can be anchored to the base 440 of the fiber holder 406. The base 440 of the fiber holder 406 may have fiber positioning grooves 454 for receiving the plurality of optical fibers 416. In certain examples, the fiber positioning grooves 454 can be V-shaped grooves and/or U-shaped grooves, although alternatives are possible. The plurality of optical fibers 416 have fiber ends 456 (e.g., free end portions, bare fiber portions (e.g., fiber portions with only a core and cladding)) that project from the first end 450 of the fiber holder 406 of the multi-fiber fiber optic connector 400. In the example shown, there are twelve optical fibers 416. In certain examples, however, the multi-fiber fiber optic connector 400 may include a greater or lesser number of optical fibers 416 (e.g., one fiber, two fibers, six fibers, eight fibers, twenty-four fibers, etc.).

In certain examples, the cover 438 of the fiber holder 406 can include at least one epoxy injection port 458. The depicted cover 438 includes two ports 458. Epoxy can be injected into the least one epoxy injection port 458 to anchor the plurality of optical fibers 416 within the fiber holder 406. By bonding the plurality of optical fibers 416, the plurality of optical fibers 416 can be held in an aligned position.

In certain examples, the shroud 402 includes a first shroud piece 460 (e.g., a base, a bottom) and a second shroud piece (e.g., a top, a cover) 462. In other examples, the shroud 402 can be a one-piece shroud. In certain examples, the first and second shroud pieces 460, 462 of the shroud 402 can each include latches 464, 466 that are configured to be received within respective recesses 468, 470 of the first and second shroud pieces 460, 462 to provide a snap-fit connection. In other examples, the first and second shroud pieces 460, 462 can be connected together via a pivotal connection or a press-fit connection.

The shroud 402 includes a shroud front end 472 and a shroud rear end 474. The fiber holder 406 can be mounted between the first and second shroud pieces 460, 462 and can be axially captured between the front end 472 of the shroud 402 and the bridge portion 420 of the connector body 404. When the dust cap is not mounted on the shroud 402, the shroud 402 is axially moveable relative to the fiber holder 406. The shroud 402 is spring biased in a forward direction with respect to the connector body 404 and the fiber holder 406. The fiber holder 406 is axially moveable relative to the connector body 404 and is preferably spring biased in a forward direction relative to the connector body 404.

The shroud 402 can be mounted at the front end 410 of the connector body 404 so as to cover the fiber holder 406. The first and second front latches 434, 436 of the connector body 404 can include catches 478 that are received within the cutout areas 444 of the first and second side walls 446, 448 of the base 440 of the fiber holder 406. The catches 478 can engage end surfaces 480 of the first and second walls 446, 448 adjacent the second end 452 of the fiber holder 406 such that the fiber holder 406 is secured to the connector body 404. Preferably, engagement between the catches 478 and the surface 480 stop forward movement of the fiber holder 406 relative to the connector body 404 while permitting a limited range of relative axial movement between the fiber holder 406 and the connector body 404.

Figure 31:
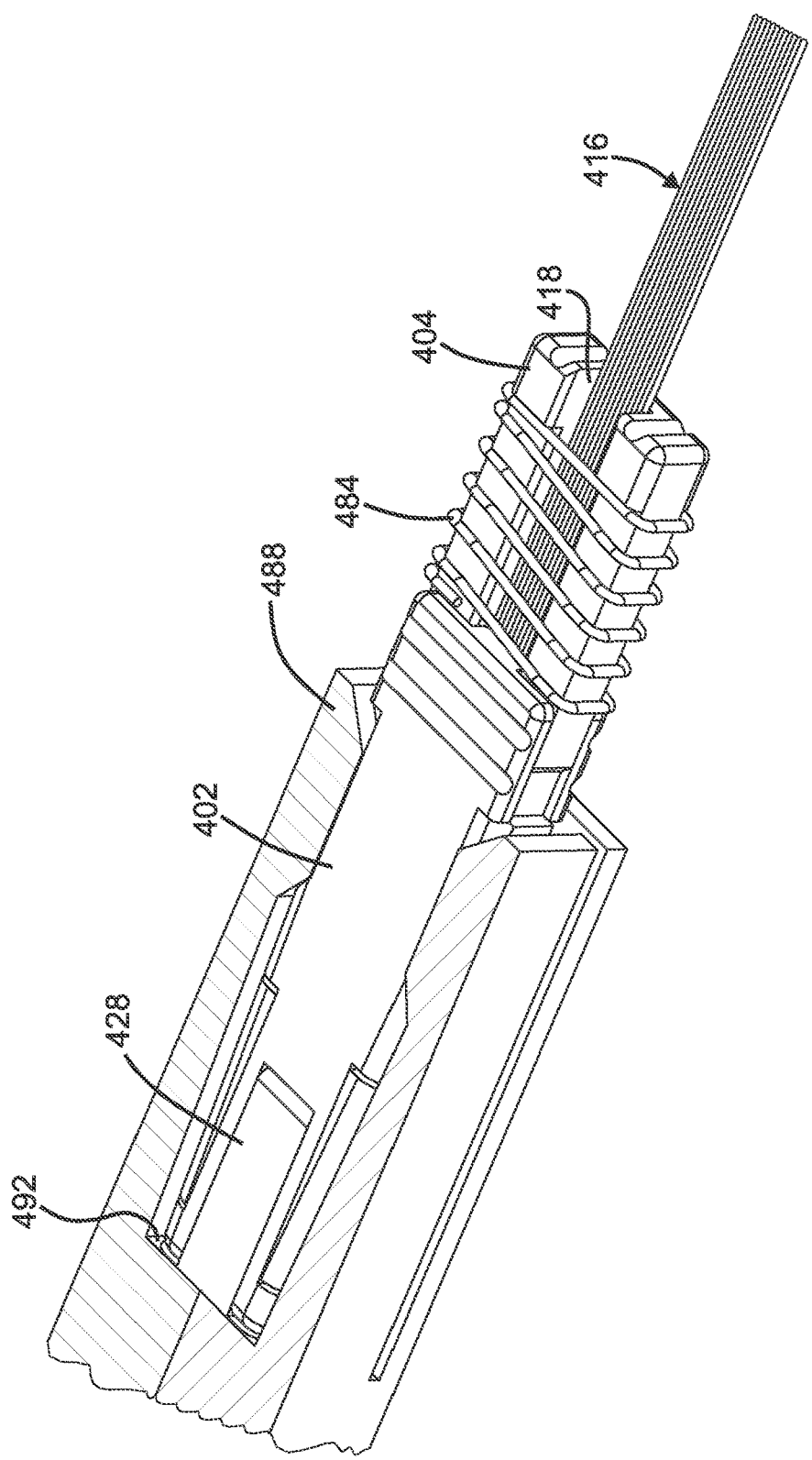
FIG. 31 illustrates a perspective view of the multi-fiber fiber optic connector of FIG. 26 prior to being latched into a multi-fiber adapter.
Figure 32:
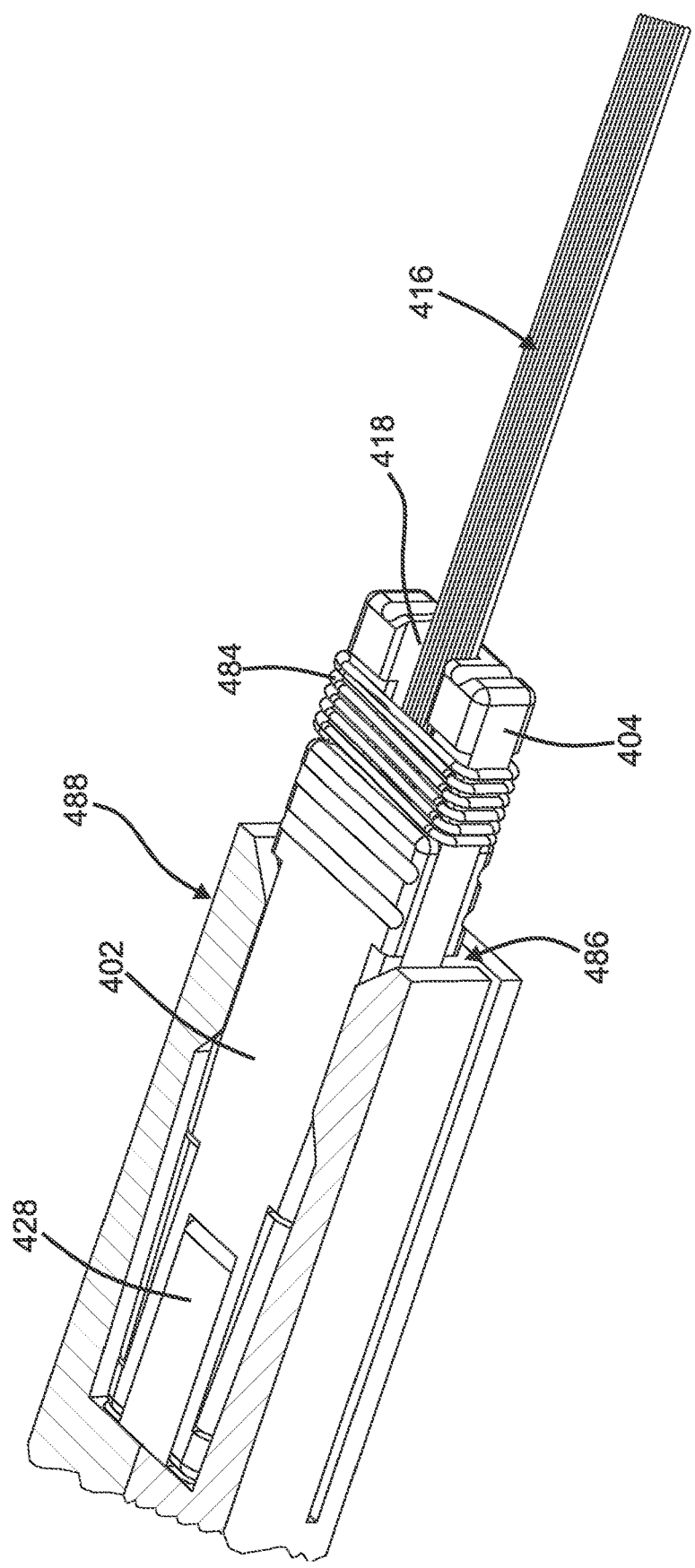
FIG. 32 illustrates a perspective view of the multi-fiber fiber optic connector of FIG. 26 latched within the multi-fiber adapter.

The shroud 402 defines fiber passages 482 (see FIG. 30) through which the fiber ends 456 of the plurality of optical fibers 416 extend. The shroud 402 is movable along the longitudinal axis 414 between an extended position (see FIGS. 31, 33) where the fiber ends 456 of the plurality of optical fibers 416 are protected within the fiber passages 482 and a retracted position (see FIG. 32) where the fiber ends 456 of the plurality of optical fibers 416 project forwardly beyond the shroud 402. The multi-fiber fiber optic connector 400 includes a shroud spring 484 for biasing the shroud 402 toward the extended position. The shroud spring 484 may be configured to bias the shroud 402 relative to the connector body 404. The shroud spring 484 mounts around the rear end 412 of the connector body 404 and is positioned to abut against the spring stop 426 when biasing the shroud 402 forward. The flange portion 430 of the connector body 404 can function as a stop member for the shroud 402 when in the extended position. For example, end wall 476 of the shroud 402 can fit in the channel 418 and can abut against the flange portion 430 when the shroud 402 is in the extended position. The end wall 476 can slide within the channel 418 when the shroud 402 is moved from the extended position toward the retracted position and can engage the shroud spring 484 to cause compression of the shroud spring 484 as the shroud 402 is moved toward the retracted position relative to the connector body 404.

In certain examples, relative movement is permitted between the shroud 402 and the plurality of optical fibers 416 held by the fiber holder 406 so that the shroud 402 can slide relative to the plurality of optical fibers 416. In certain examples, the fiber ends 456 of the plurality of optical fibers 416 may extend beyond the shroud 402 when the shroud 402 is in the retracted position and can be housed within the shroud 402 when the shroud 402 is in the extended position. In certain examples, the fiber ends 456 project at least 3, 4, 5 or 6 millimeters beyond the shroud 402 when the shroud 402 is fully retracted, although alternatives are possible.

The multi-fiber fiber optic connector 400 can be mounted within a mating first adapter port 486 of a multi-fiber adapter 488. The first and second front latches 434, 436 positioned at the first and second minor sides 422, 424 of the connector body 404 each include a catch 490 (see FIGS. 26-27). Latches (not shown) of the multi-fiber adapter 488 can define an aperture configured to receive the catches 490 of the connector body 404 of the multi-fiber fiber optic connector 400 when the multi-fiber fiber optic connector 400 is mounted into the mating first adapter ports 486. As such, the catches 490 and the apertures of the latches of the multi-fiber adapter 488 form a latching arrangement that allows the multi-fiber fiber optic connector 400 to be interlocked within the mating first adapter port 486 of the multi-fiber adapter 488.

The multi-fiber adapter 488 can be used to assist in optically coupling together the multi-fiber fiber optic connector 400 with another multi-fiber fiber optic connector (not shown). The other multi-fiber fiber optic connector can have the same features as the multi-fiber fiber optic connector 400. The multi-fiber adapter 488 can also include a second adapter port (now shown) opposite the mating first adapter port 486 for respectively receiving the other multi-fiber fiber optic connector to couple with the multi-fiber fiber optic connector 400.

The multi-fiber adapter 488 can also include an internal bare fiber alignment system (not shown) that includes multiple fiber alignment grooves (not shown). It will be appreciated that the multi-fiber adapter 488 is configured to receive optical fibers that are not supported by or secured within a ferrule. The fiber passages 482 of the shroud 402 can be arranged and configured to align with the multiple fiber alignment grooves of the internal bare fiber alignment system upon insertion of the multi-fiber fiber optic connector 400 into the mating first adapter port 486 of the multi-fiber adapter 488. The multiple fiber alignment grooves of the internal bare fiber alignment system can extend along the longitudinal axis 414 or fiber insertion axis to receive the fiber ends 456 of the plurality of optical fibers 416 projecting forwardly beyond the shroud 402. The fiber passages 482 can be configured for receiving and co-axially aligning the fiber ends 456 of the plurality of optical fibers 416 of the multi-fiber fiber optic connector 400 with optical fibers of the other connector such that optical signals can be conveyed therebetween. The dust cap is preferably manually removed prior to insertion of the connector 400 within the adapter 488.

As the multi-fiber fiber optic connecter 400 is inserted into the mating first adapter port 486, the shroud 402 is pushed until the shroud front end 472 contacts an end wall 492 of the multi-fiber adapter 488. The end wall 492 functions as a stop for the shroud 402 such that continued insertion of the multi-fiber fiber optic connector 400 into the mating first adapter port 486 causes the connector body 404 to move relative to the shroud 402 until the catches 490 of the connector body 404 snap into the latches of the multi-fiber adapter 488. The shroud 402 is also biased forward by the shroud spring 484. Also, as the multi-fiber fiber optic connector 400 is pushed into the mating first adapter port 486 while the shroud 402 is in contact with the end wall 492, the fiber ends 456 can slide through the shroud 402 and project from the fiber passages 482 into the multiple fiber alignment grooves of the internal bare fiber alignment system. The same can be true of the other connector such that the optical fibers of the connectors can be optically coupled together.

The multi-fiber fiber optic connector 400 may include a fiber holder spring 494 for biasing the fiber holder 406 in a forward direction relative to the connector body 404. The fiber holder spring 494 can be captured between the second end 452 of the fiber holder 406 and an inner wall surface 496 of the bridge portion 420 of the connector body 404. The fiber holder 406 can be pushed back against the fiber holder spring 492 when the multi-fiber fiber optic connector 400 is mated with another connector and opposed fiber ends of the connectors are optically coupled together. The shroud 402 can be pulled to unlatch the multi-fiber fiber optic connector 400 from the mating first adapter port 486.

Figure 33:
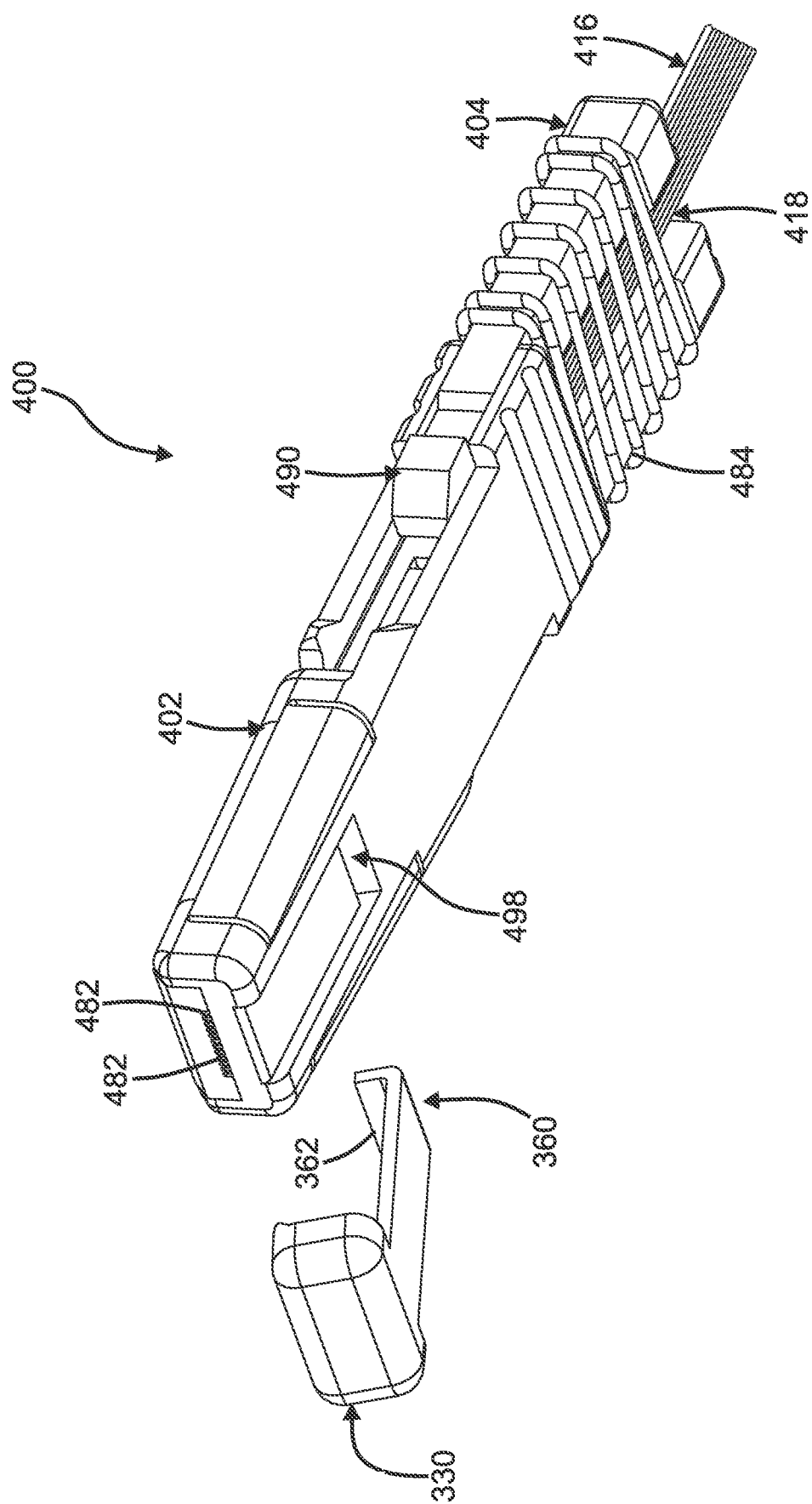
FIG. 33 illustrates a bottom, perspective view of the multi-fiber fiber optic connector of FIG. 26 showing the dust cap of FIG. 26 removed.
Figure 34:
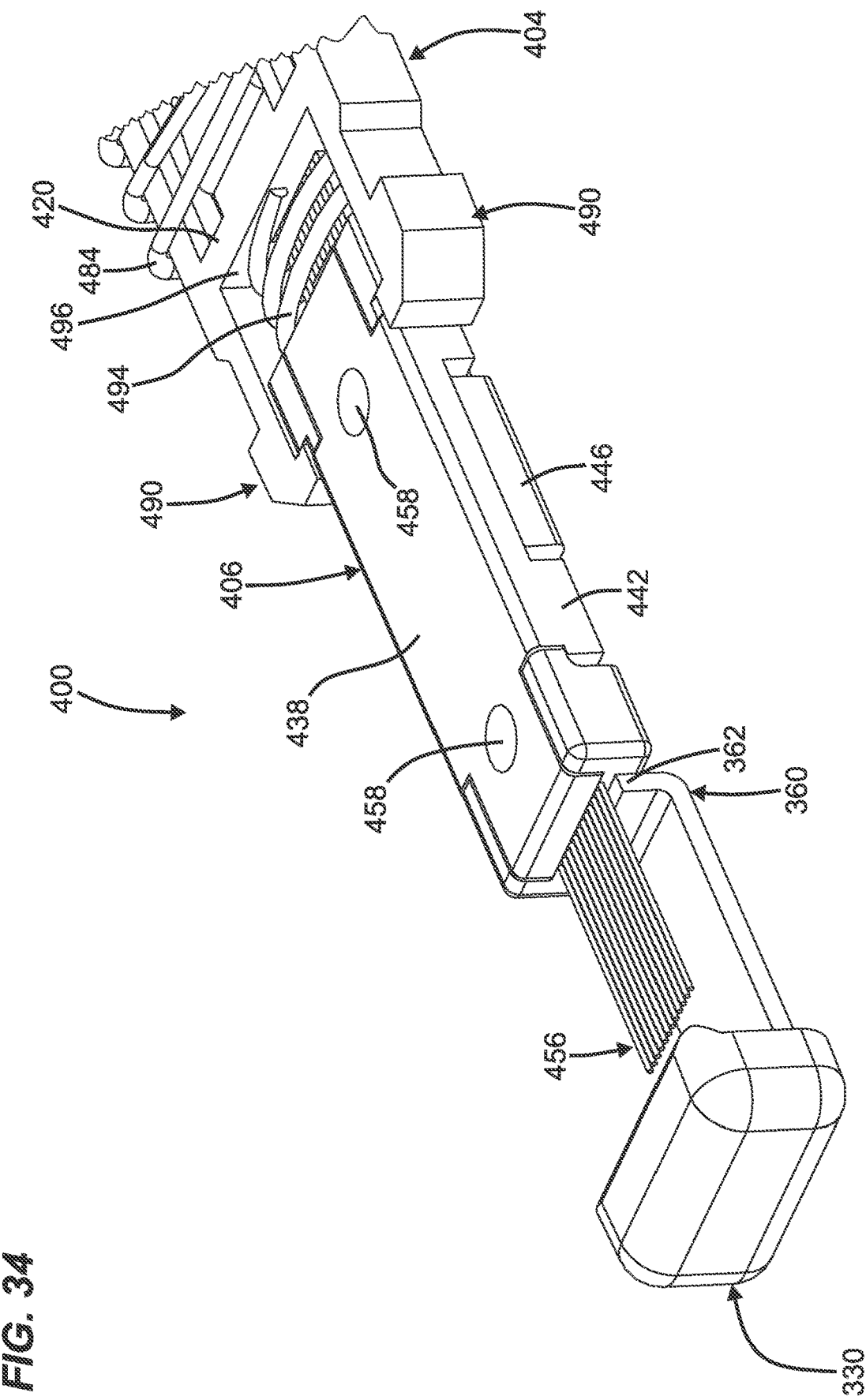
FIG. 34 illustrates a perspective view of the dust cap of FIG. 26 in position relative to a fiber holder of the multi-fiber fiber optic connector.

Turning to FIGS. 33-34, the multi-fiber fiber optic connector 400 can further include the dust cap 330 that mounts over the shroud front end 472 of the shroud 402. That is, the cavity 336 of the dust cap 330 can be positioned over the shroud front end 472 of the shroud 402 when installed and thereby protect polished ends of the fiber ends 456. The dust cap 330 optionally provides a seal about the shroud front end 472 of the shroud 402 to shield it from contamination. The projection 362 of the at least one resilient latch 360 of the dust cap 330 is configured to engage an opening 498 defined in the first shroud piece 460 of the shroud 402 to form a snap-fit connection between the dust cap 330 and the shroud 402. As such, the at least one resilient latch 360 releasably latches the dust cap 330 on the shroud 402.

When the dust cap 330 is mounted on the shroud 402, the projection 362 of the at least one resilient latch 360 extends through the opening 498 of the first shroud piece 460 and opposes a front end of the fiber holder 406. The projection 362 of the dust cap 330 engages the front end of the fiber holder 406 to prevent the shroud 402 from moving from the forward position to the rearward position relative to the fiber holder 406 and the connector body 404. As such, the least one resilient latch 360 can function as a stop to lock the shroud 402 relative to the fiber holder 406 which allows the fiber ends 456 to remain protected within the shroud 402. In other examples, the dust cap 330 can engage the connector body 404 to prevent movement of the shroud 402 from the extended position to the retracted position.

Figure 35:
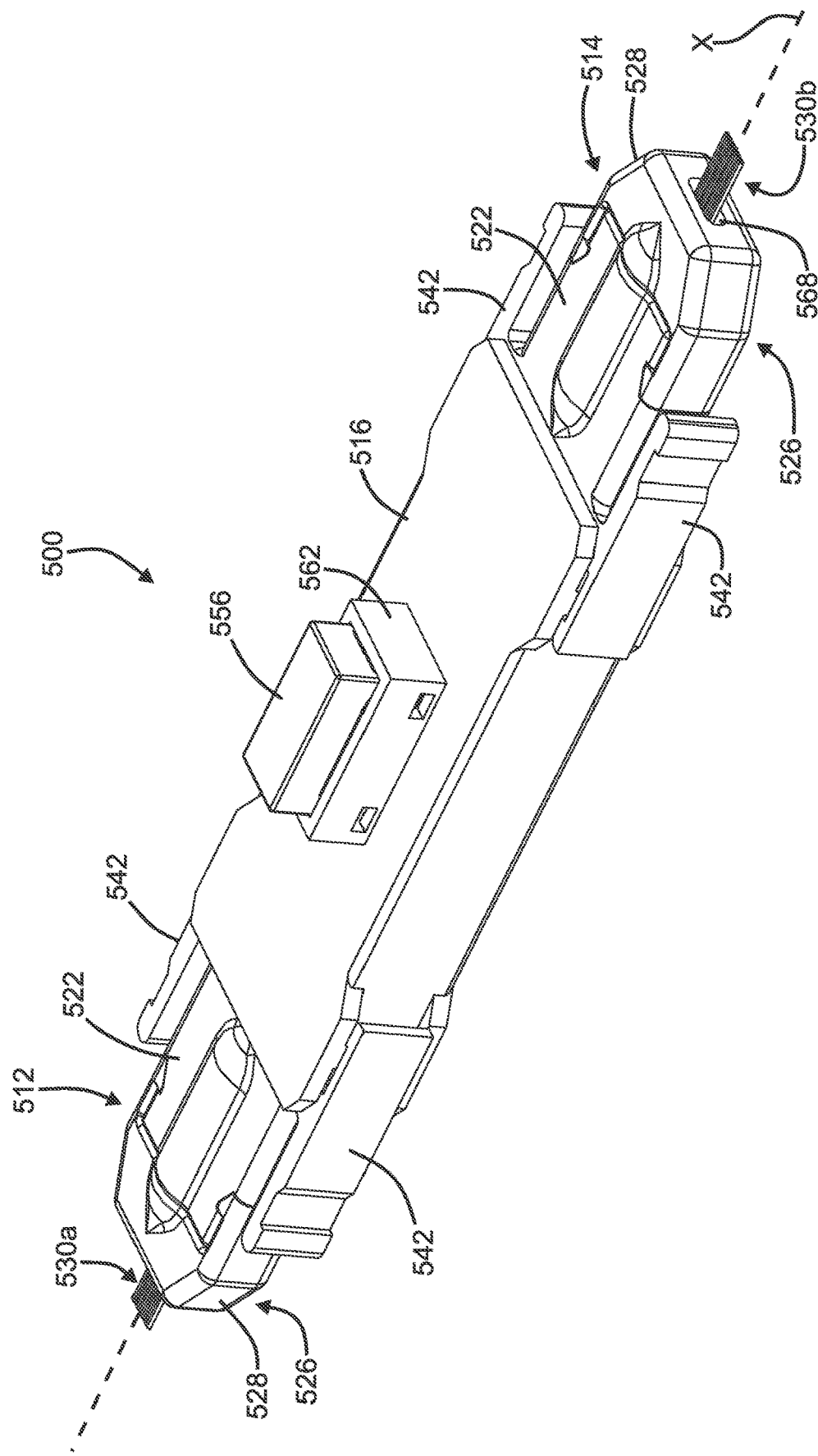
FIG. 35 illustrates a perspective view of an alternative bare fiber connection system in accordance with the principles of the present disclosure with multi-fiber fiber optic connectors and a multi-fiber adapter.
Figure 36:
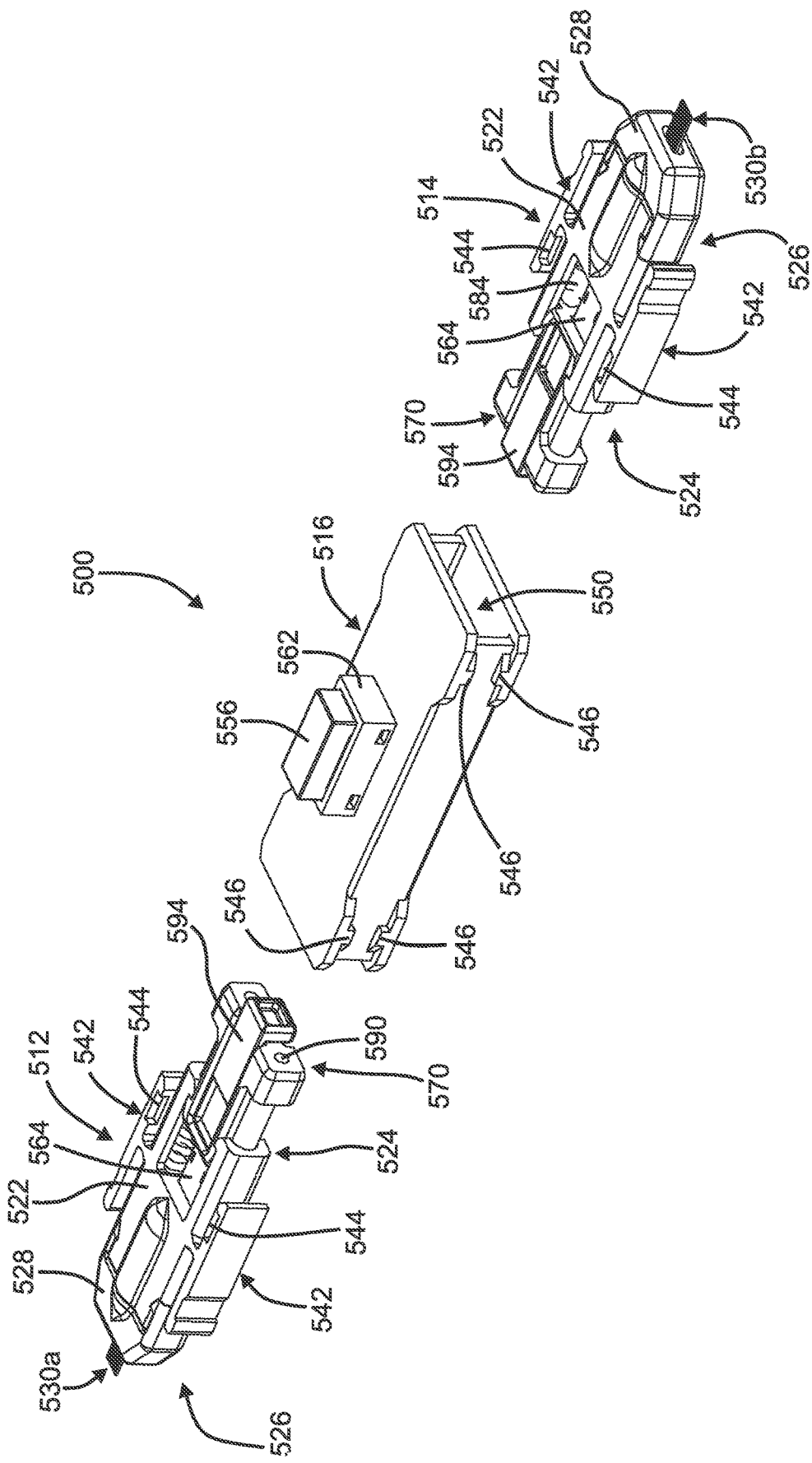
FIG. 36 illustrates an exploded view of the bare fiber connection system of FIG. 35.

Referring to FIGS. 35-36, an alternative bare fiber connection system 500 is depicted in accordance with the principles of the present disclosure. The bare fiber connection system 500 includes first and second multi-fiber fiber optic connectors 512, 514 and a multi-fiber adapter 516. In the depicted example, the first and second multi-fiber fiber optic connectors 512, 514 are bare fiber multi-fiber fiber optic connectors.

The first and second multi-fiber fiber optic connectors 512, 514 each include a connector body 522 that has a front end 524 and a rear end 526. The connector body 522 defines a longitudinal axis X that extends through the connector body 522 in an orientation that extends from the front end 524 to the rear end 526 of the connector body 522. In certain examples, the connector body 522 can includes a rear piece connector body 528 that can be mounted to the connector body 522 by a snap-fit connection, although alternatives are possible.

The first multi-fiber fiber optic connector 512 includes a first plurality of optical fibers 530a that extend through the connector body 522 from the rear end 526 to the front end 524. The second multi-fiber fiber optic connector 514 includes a second plurality of optical fibers 530b that extend through the connector body 522 from the rear end 526 to the front end 524. The first and second plurality of optical fibers 530a, 530b have fiber ends 532 (e.g., free end portions, bare fiber portions) (see FIG. 45) that are respectively accessible at the front ends 524 of the connector bodies 522 of the first and second multi-fiber fiber optic connectors 512, 514. In certain examples, the plurality of optical fibers 530a, 530b may be ribbonized, buffered, or otherwise contained within a passage of an outer jacket.

Figure 38:
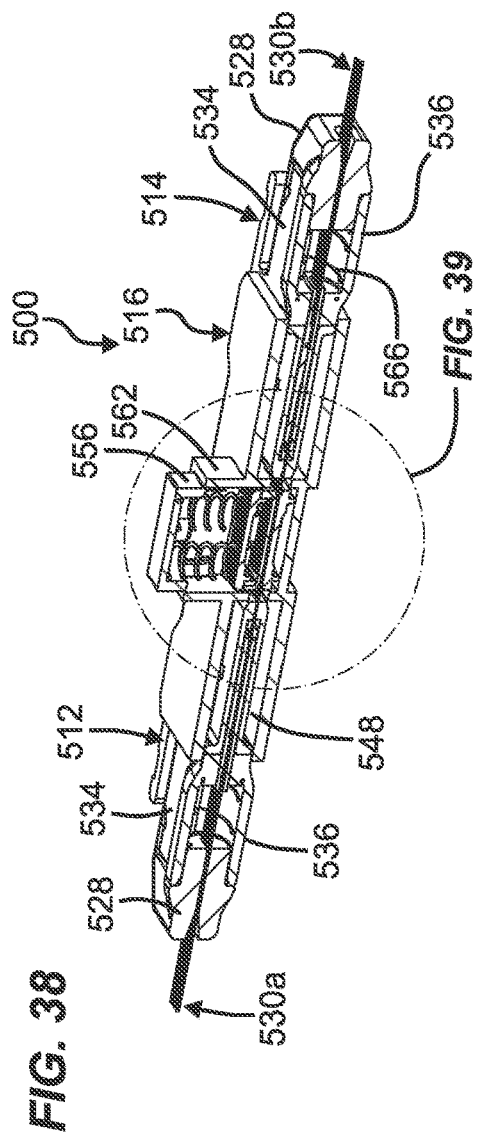
FIG. 38 illustrates a cross-sectional view taken along line 38-38 of FIG. 37.
Figure 39:
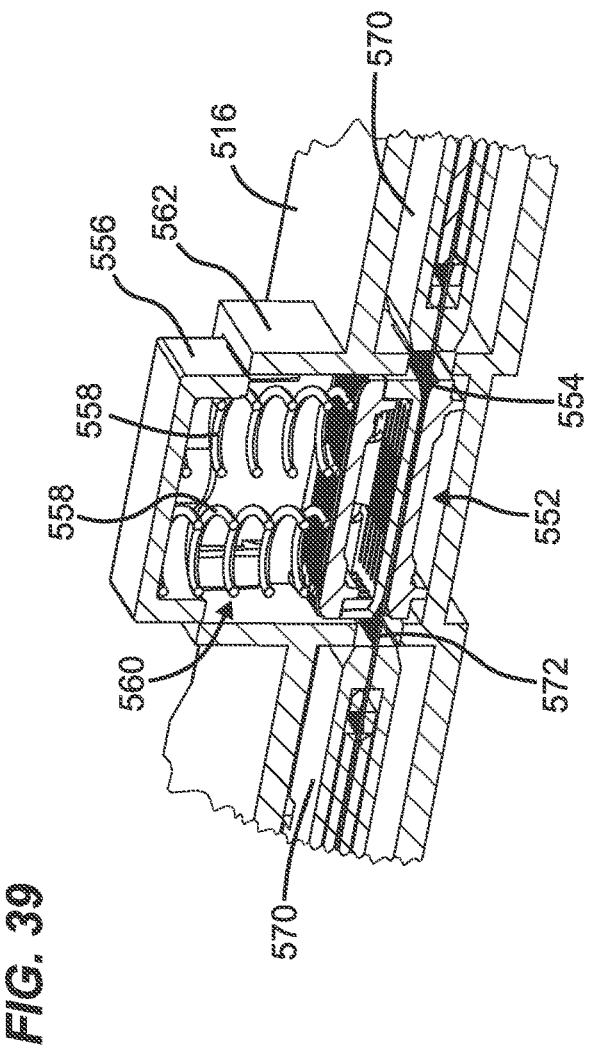
FIG. 39 illustrates an enlarged view of a portion of the bare fiber connection system of FIG. 38.
Figure 37:
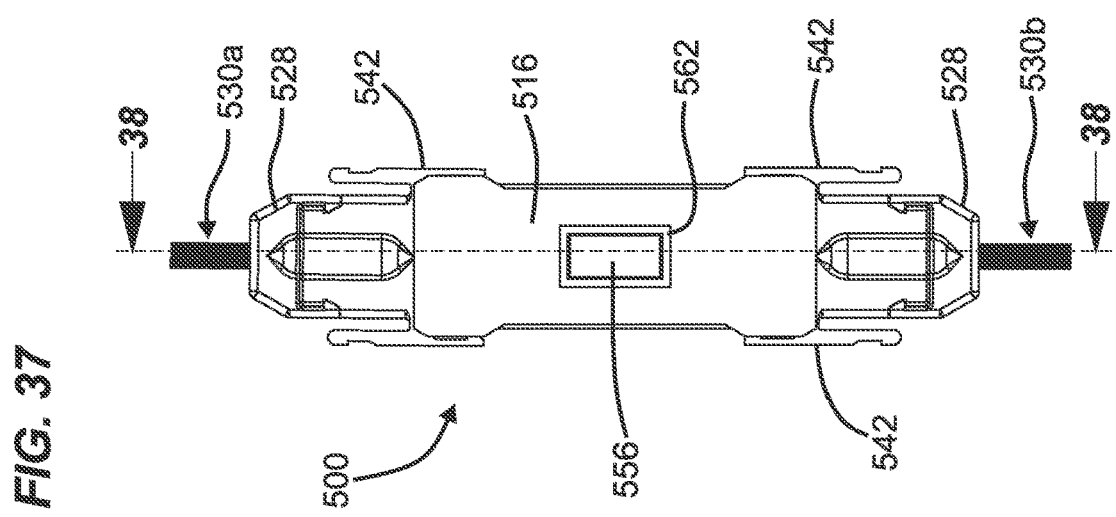
FIG. 37 illustrates a top view of the bare fiber connection system of FIG. 35.

Turning to FIGS. 37-39, the bare fiber connection system 500 is depicted. The first and second multi-fiber optic connectors 512, 514 are identical. As such, only the first multi-fiber fiber optic connector 512 will be described in detail. It will be appreciated that the features described herein with reference to the first multi-fiber fiber optic connector 512 will also apply to the second multi-fiber fiber optic connector 514.

The connector body 522 has a first major side (e.g., top side) 534, an opposite, second major side (e.g., bottom side) 536, a first minor side 538, and an opposite, second minor side 540. In certain examples, the first and second minor sides 538, 540 of the connector body 522 include latches 542 with recesses 544 configured to engage fixed catches 546 on the multi-fiber adapter 516 as part of a latching arrangement to allow the first multi-fiber fiber optic connector 512 to be secured (e.g., interlocked) within a mating first adapter port 548 (see FIG. 38) of the multi-fiber adapter 516.

The multi-fiber adapter 516 can be used to assist in optically coupling together the first and second multi-fiber fiber optic connectors 512, 514. The multi-fiber adapter 516 can also include a second adapter port 550 (see FIG. 36) opposite the first adapter port 548 for respectively receiving the second multi-fiber fiber optic connector 514 to couple the first and second multi-fiber fiber optic connectors 512, 514 together.

It will be appreciated that the multi-fiber adapter 516 is configured to receive optical fibers that are not supported by or secured within a ferrule. The multi-fiber adapter 516 includes a groove-defining piece 552 (e.g., internal bare fiber alignment piece, alignment device) positioned between the first and second adapter ports 548, 550. The groove-defining piece 552 defines multiple fiber alignment grooves 554 (e.g., alignment passages) for receiving and co-axially aligning the fiber ends 532 of the first and second plurality of optical fibers 530a, 530b of the first and second multi-fiber fiber optic connectors 512, 514 to provide an optical connection therebetween.

The multi-fiber adapter 516 may include an adapter cover 556 that can engage the groove-defining piece 552 via a biasing component 558 (e.g., a spring, a leaf spring). The adapter cover 556 can be configured to fit within a receptacle 560 of an adapter cover support structure 562 to generate spring biasing load/force that translates through the groove-defining piece 552 for pressing the optical fibers 530a, 530b into their corresponding fiber alignment grooves 554.

Turning to FIGS. 40-43, the first and second multi-fiber fiber optic connectors 512, 514 of the bare fiber connection system 500 can each include a fiber holder 564 with similar features as described above. The first plurality of optical fibers 530a routed through the first multi-fiber fiber optic connector 512 can be anchored to fiber positioning grooves of the fiber holder 564. The connector body 522 may also include rear outboard springs 566 for biasing the fiber holder 564 in a forward direction. The rear outboard springs 566 can be captured between the rear piece connector body 528 and the fiber holder 564. The rear piece connector body 528 defines an opening 568 (see FIG. 46) for routing the first plurality of optical fibers 530a therethrough.

The first and second multi-fiber fiber optic connectors 512, 514 of the bare fiber connection system 500 can also include a retractable shroud (e.g., nose piece) 570 that mounts at the front end 524 of the connector body 522. The retractable shroud 570 can be moveable along the longitudinal axis relative to the connector body 522 between a forward position (e.g., extended position) (see FIG. 40) and a rearward position (e.g., retracted position) (see FIG. 45). The retractable shroud 570 defines a plurality of fiber passages 572 (see FIG. 39) through which the plurality of optical fibers 530a extend. When the retractable shroud 570 is in the rearward position, the fiber ends 532 of the first plurality of optical fibers 530a project forwardly beyond the retractable shroud 570. When the retractable shroud 570 is in the forward position, the fiber ends 532 are protected within the retractable shroud 570.

The connector body 522 further includes a first front latch 574 that extends from the first minor side 538 of the connector body 522 and a second front latch 576 that extends from the second minor side 540 of the connector body 522 for securing the retractable shroud 570 to the connector body 522. The retractable shroud 570 includes shroud catches 578 that engage connector catches 580 of the first and second front latches 574, 576 when in the forward position.

Figure 40:
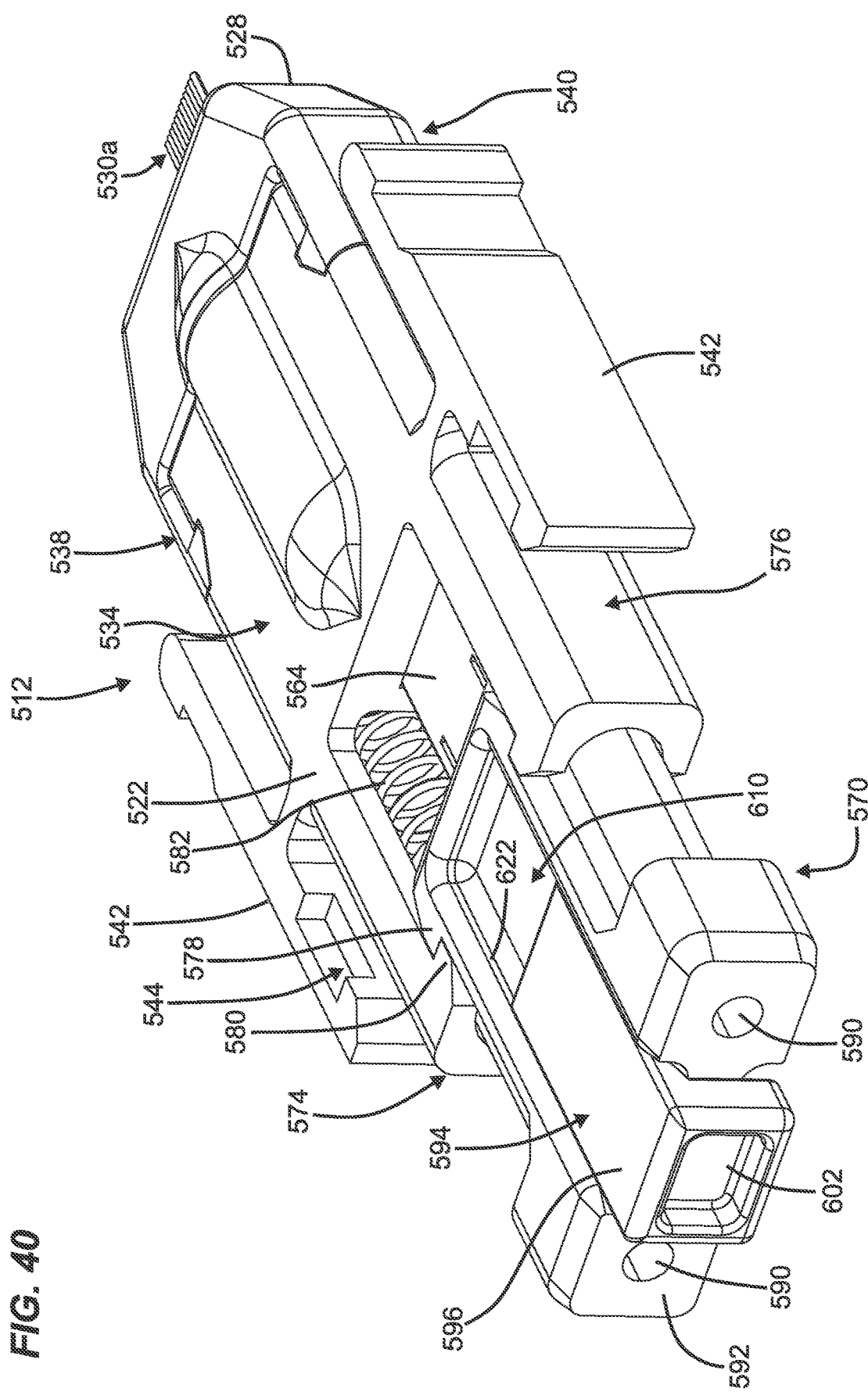
FIG. 40 illustrates a perspective view of one multi-fiber fiber optic connector of FIG. 35 including a retractable shroud in an extended position and a lockout dust cap.
Figure 42:
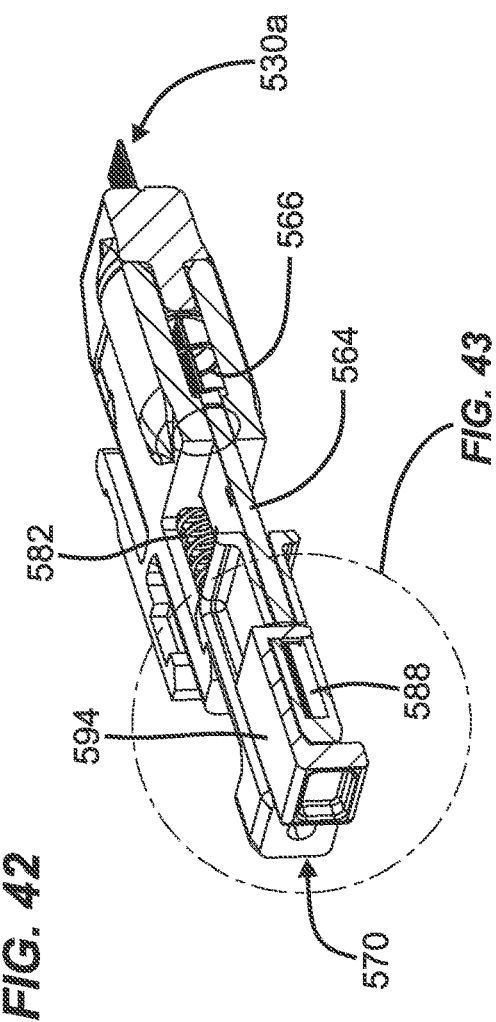
FIG. 42 illustrates a cross-sectional view taken along line 42-42 of FIG. 41.
Figure 43:
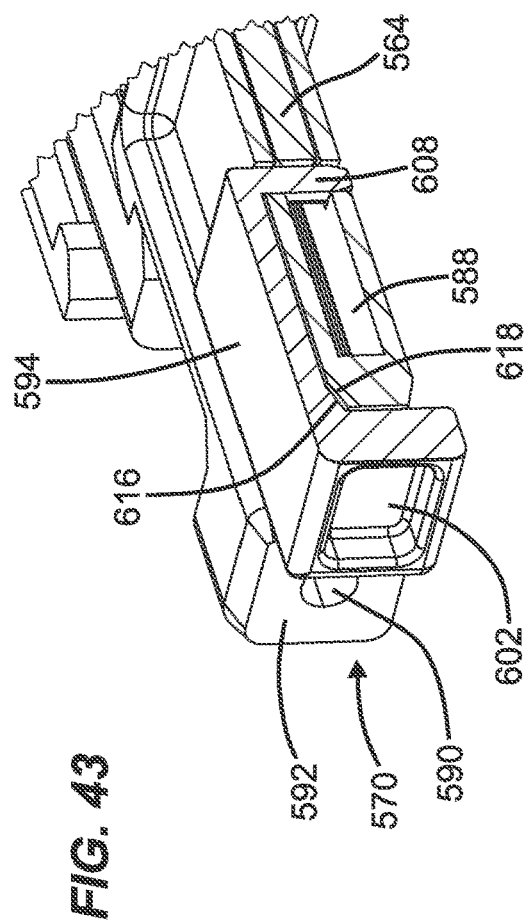
FIG. 43 illustrates an enlarged perspective view of a portion of the multi-fiber fiber optic connector of FIG. 42.
Figure 41:
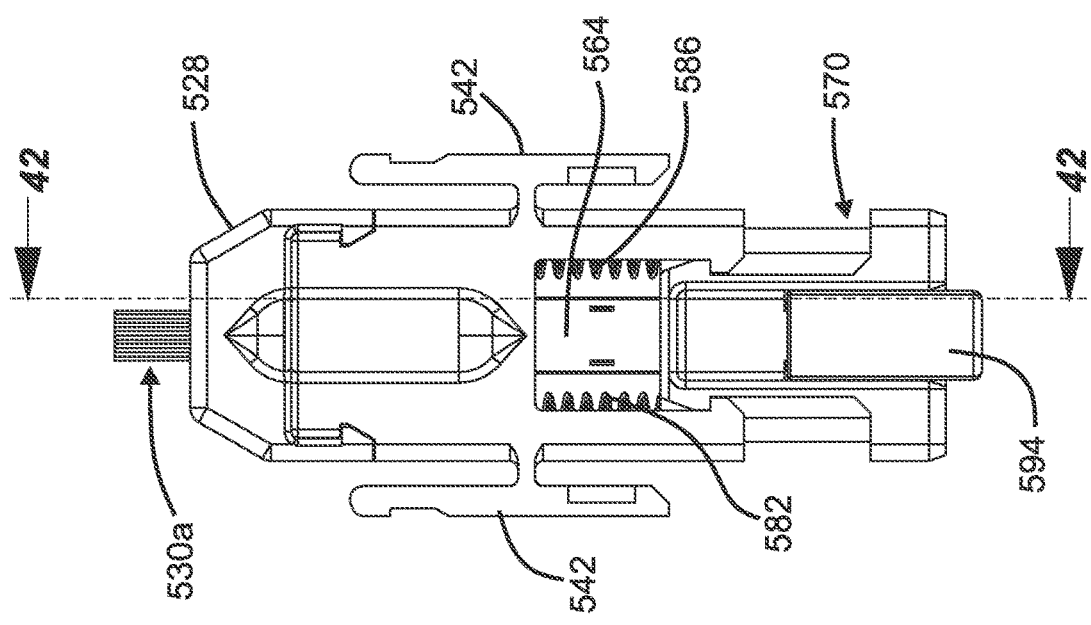
FIG. 41 illustrates a top view of the multi-fiber fiber optic connector of FIG. 40.

Still referring to FIG. 40, a first outboard spring 582 of the first multi-fiber fiber optic connector 512 may be mounted in an inside surface 584 (see FIG. 36) of the first front latch 574 at the first minor side 538 of the connector body 522 and a second outboard spring 586 (see FIG. 41) may be mounted on the inside surface 584 of the second front latch 576 at the second minor side 540 of the connector body 522. The first and second outboard springs 582, 586 may be configured to bias the retractable shroud 570 to the forward position relative to the connector body 522. In certain examples, the fiber holder 564 can be positioned between the first and second outboard springs 582, 586. In certain examples, the retractable shroud 570 is configured to be mounted between the first and second front latches 574, 576 of the connector body 522. The retractable shroud 570 is moveable along the inside surfaces 584 of the first and second front latches 574, 576 between the forward and rearward positions. The retractable shroud 570 defines a cavity 588 (see FIG. 43) within which the fiber holder 564 is slidable.

Figure 44:
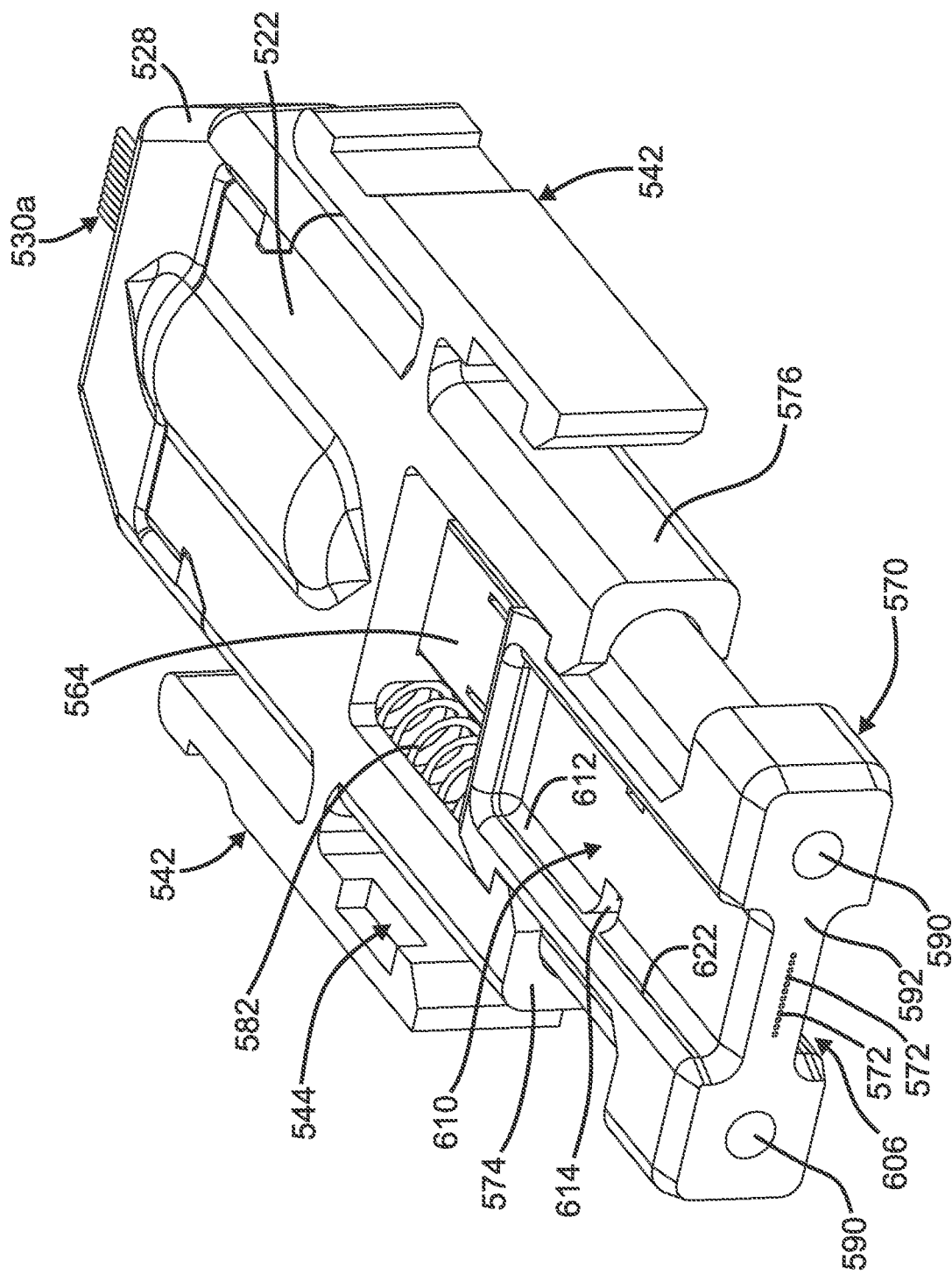
FIG. 44 illustrates a perspective view of the multi-fiber fiber optic connector of FIG. 40 with the lockout dust cap removed.
Figure 45:
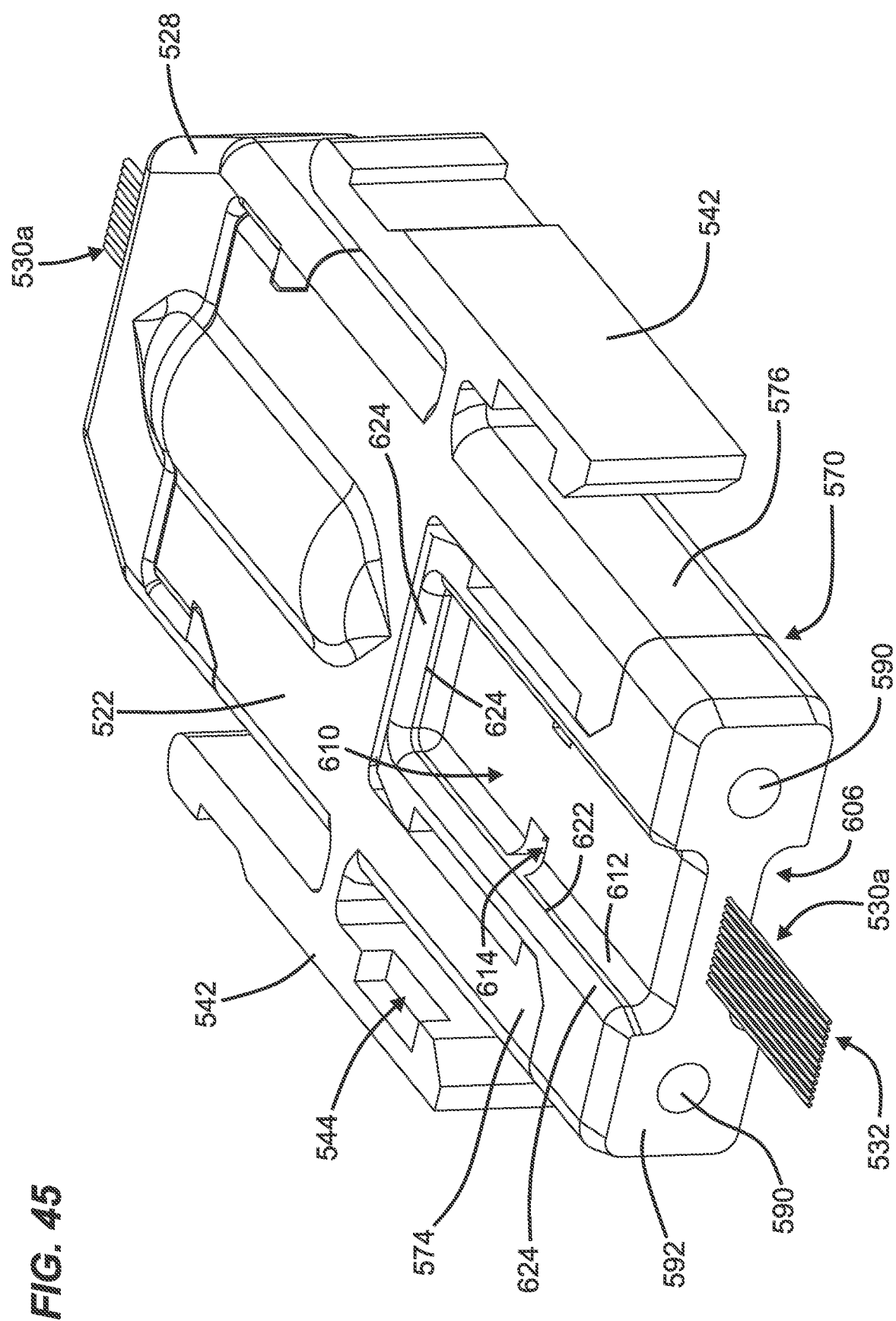
FIG. 45 illustrates a perspective view of the multi-fiber fiber optic connector of FIG. 40 with the retractable shroud in a retracted position.

Turning to FIGS. 44-45, a pair of guide holes 590 may be formed on an end face 592 of the retractable shroud 570 which can cooperate with guide pins (not shown) on the groove-defining piece 552. As the first multi-fiber fiber optic connecter 512 is inserted into the first adapter port 548, the retractable shroud 570 can retract relative to the connector body 522. When the retractable shroud 570 is in the rearward position, the plurality of optical fibers 530a can project from the fiber passages 572 of the retractable shroud 570 into the multiple fiber alignment grooves 554 of the groove-defining piece 552. The same can be true of the second multi-fiber fiber optic connector 514 such that the first and second plurality of optical fibers 530a, 530b can be optically coupled together.

Figure 46:
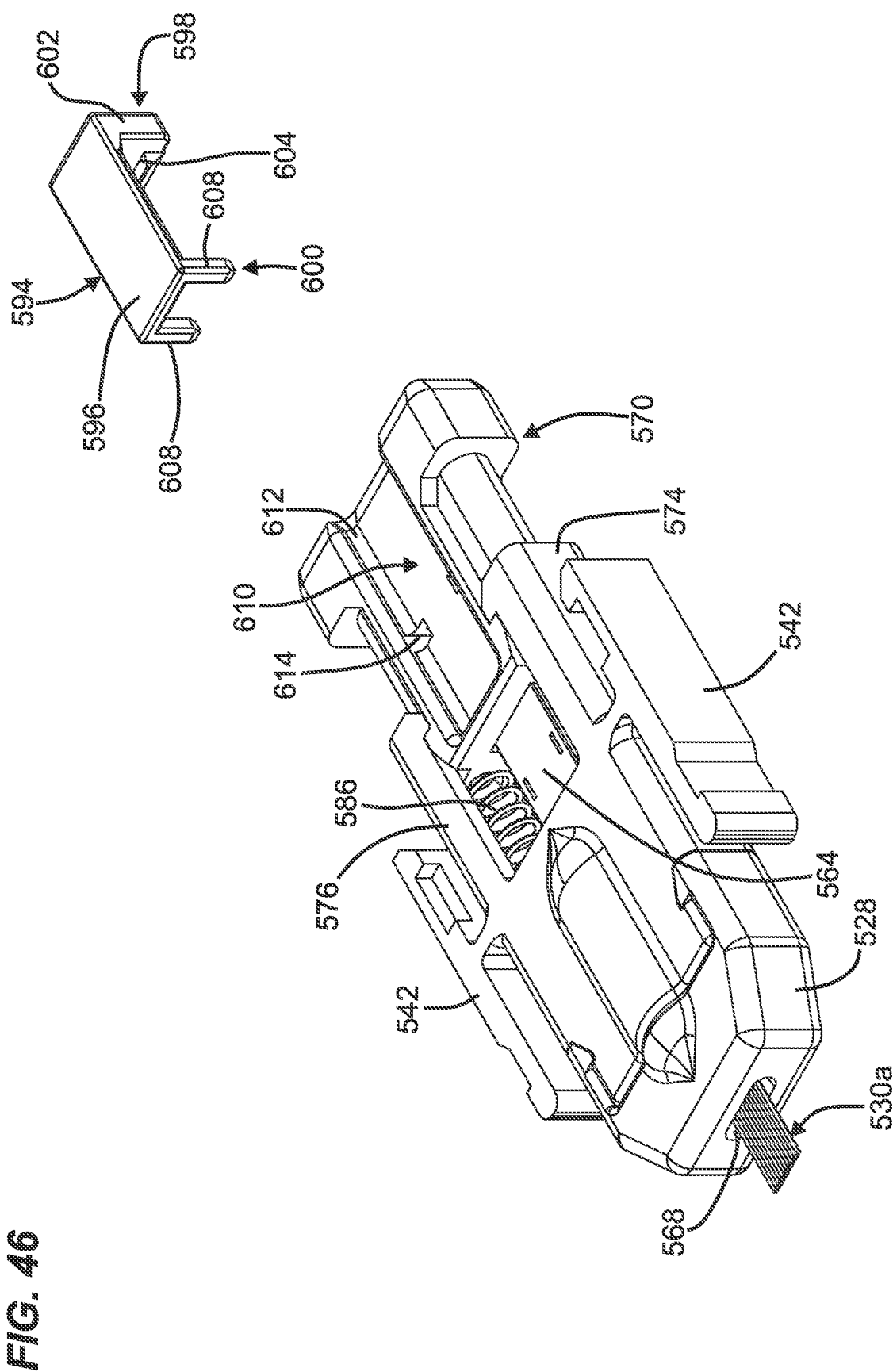
FIG. 46 illustrates a perspective view of the multi-fiber fiber optic connector of FIG. 40 with the lockout dust cap exploded from the retractable shroud.
Figure 48:
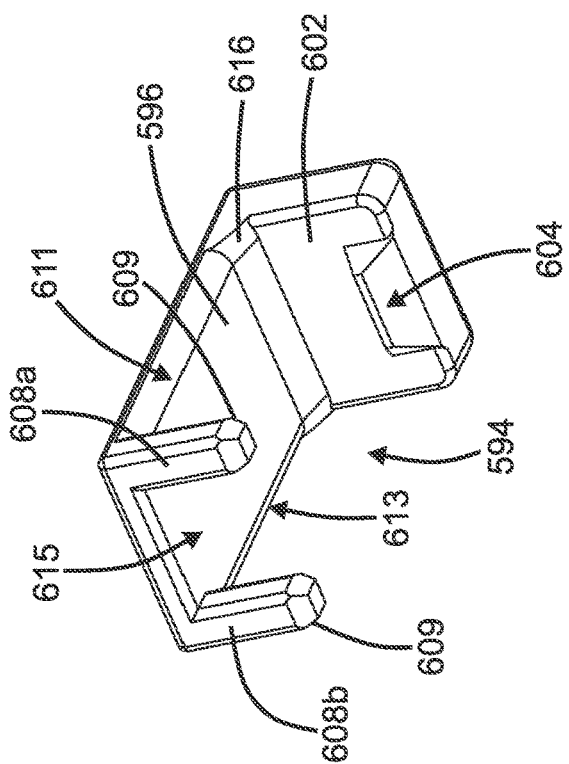
FIGS. 47-48 illustrate perspective views of the lockout dust cap of FIG. 46.
Figure 47:
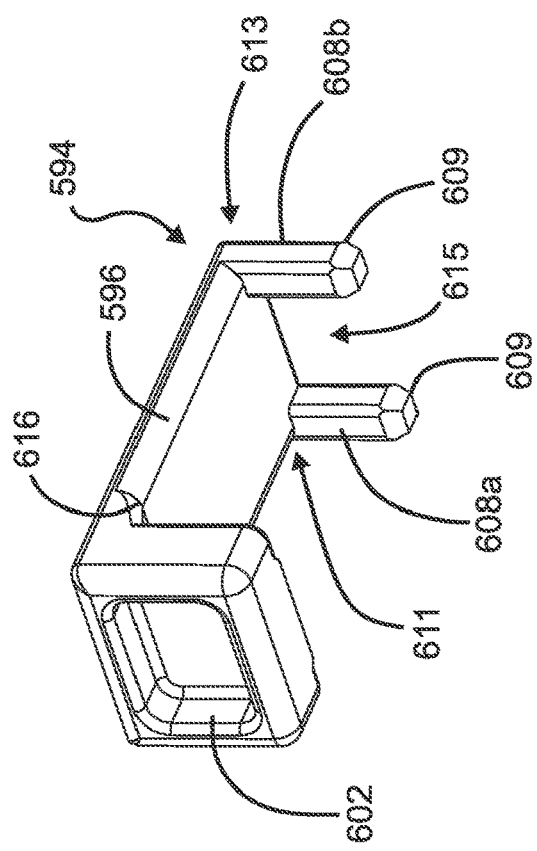

Referring to FIGS. 46-48, the bare fiber connection system 500 further includes a lockout dust cap 594 that mounts over a distal end of the retractable shroud 570. The lockout dust cap 594 includes a main body 596 with a first end 598 and an opposite second end 600. The lockout dust cap 594 also has a first side 611 and an opposite second side 613. A shield member 602 is located at the first end 598 of the main body 596 of the lockout dust cap 594. The shield member 602 is shown extending in a direction perpendicular to the main body 596 of the lockout dust cap 594. The shield member 602 being configured to cover the front end of the retractable shroud 570 to shield it from contamination. The shield member 602 includes a hook 604 configured to engage an underside 606 (e.g., bottom side) of the retractable shroud 570 to form a snap-fit connection between the retractable shroud 570 and the lockout dust cap 594. The hook 604 can releasably latch the lockout dust cap 594 on the retractable shroud 570.

The lockout dust cap 594 also includes fingers 608 at the second end 600 thereof. The fingers 608 (e.g., projections, legs) extend from the main body 596 in a direction perpendicular thereto such that the fingers 608 are parallel to the shield member 602. The fingers 608 can have tapered sides at the free ends 609. The lockout dust cap 594 can include a first finger 608a that extends downwardly from the main body 596 at the first side 611 and a second finger 608b that extends downwardly from the main body 596 at the second side 613.

Figure 50:
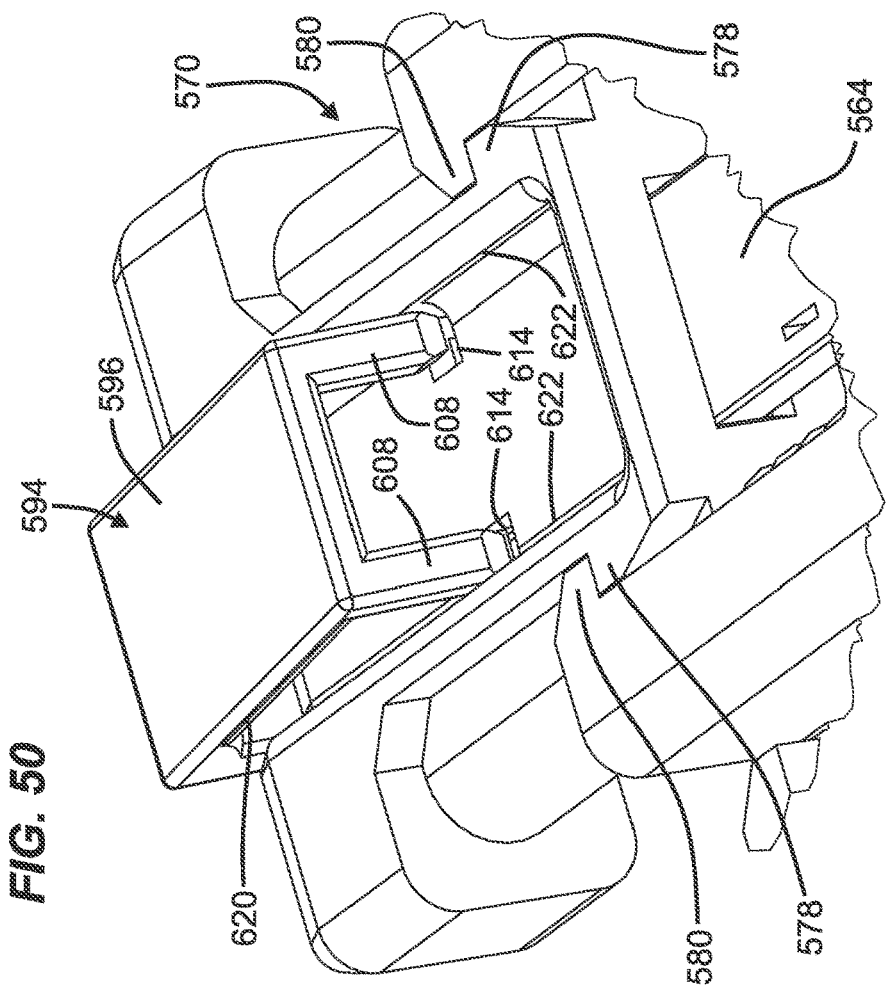
FIG. 50 illustrates an enlarged perspective view of a portion of the multi-fiber fiber optic connector of FIG. 49.
Figure 49:
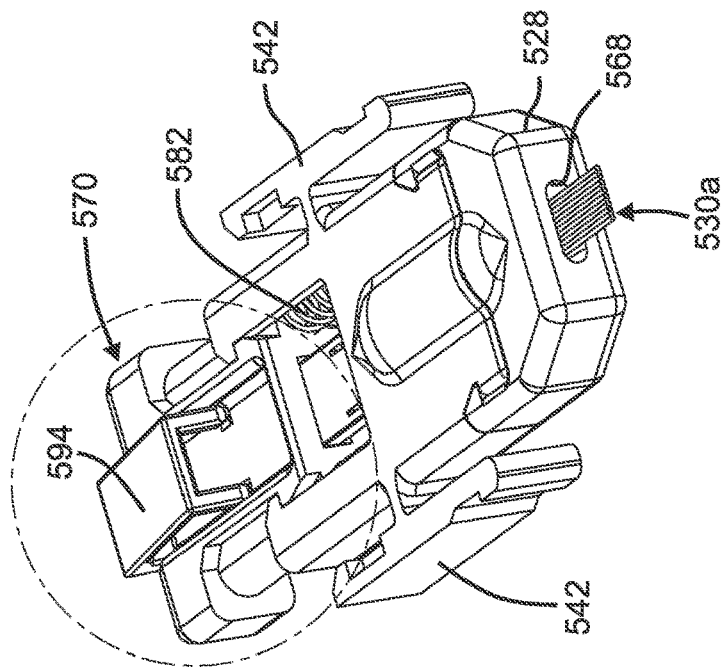
FIG. 49 illustrate a perspective view of the multi-fiber fiber optic connector of FIG. 40 with the lockout dust cap positioned prior to being mounted to the retractable shroud.

In certain examples, the shield member 602 and the fingers 608 are integrally formed with main body of the lockout dust cap 594, although alternatives are possible. The retractable shroud 570 has sidewalls 624 that together define a recessed top side 610 opposite the underside 606. The sidewalls 624 also define rounded corners 612 in the recessed top side 610 of the retractable shroud 570. The underside 606 and the recessed top side 610 are major shroud sides of the retractable shroud 570. An aperture 614 can be defined in each of the rounded corners 612 of the retractable shroud 570 for receiving the fingers 608 of the lockout dust cap 594 when the lockout dust cap 594 is mounted to the retractable shroud 570. The fingers 608 mount in the apertures 614 such that the free ends 609 extend down to the underside 606 of the retractable shroud 570. Turning to FIGS. 49-50, when the lockout dust cap 594 is mounted to the retractable shroud 570, the fingers 608 extend through the aperture 614 and opposes a front end of the fiber holder 564. The optical fibers 503a can extend from the fiber holder 564, through the cavity 588 of the retractable shroud 570. The example lockout dust cap 594 includes a gap 615 between the first and second fingers 608a, 608b such that the optical fibers 503 may extend therethrough when the lockout dust cap 594 is positioned over the retractable shroud 570 when installed and the thereby protects polished ends of the fiber ends 532 within the retractable shroud 570 from contamination. The fingers 608 are configured to prevent the fiber holder 564 from advancing forward, which also protects the fiber ends 532 from being inadvertently crushed by the shield member 602 of the lockout dust cap 594. In certain examples, the fingers 608 can prevent the retractable shroud 570 from moving from the forward position to the rearward position relative to the connector body 522. As such, the fingers 608 can function as a stop to lock the retractable shroud 570 relative to the connector body 522. For example, the apertures 614 are defined at least in part by stop surfaces that engage the fingers 608 of the lockout dust cap 594 to prevent the retractable shroud 570 from being moved rearwardly relative to the lockout dust cap 594 when the lockout dust cap 594 is mounted on the retractable shroud 570. As indicated above, the fingers 608 engage the front end of the fiber holder 564 to prevent the lockout dust cap 594 and the retractable shroud 570 from being retracted relative to the fiber holder 564 when the lockout dust cap 594 is mounted on the retractable shroud 570.

The lockout dust cap 594 can be removed from the retractable shroud 570 by unlatching the hook 604 and lifting the fingers 608 out of the apertures 614 thereof.

From the forgoing detailed description, it will be evident that modifications and variations can be made without departing from the spirit and scope of the disclosure.

What is claimed is:

1. A bare fiber connector comprising:
a connector body that extends along a longitudinal axis of the connector between a front end of the connector body and a rear end of the connector body, the connector body defining a profile including a major dimension extending between first and second minor sides of the connector body and a minor dimension extending between first and second major sides of the connector body;
a fiber holder mounted within the connector body;
a plurality of optical fibers anchored to the fiber holder, the plurality of optical fibers having free end portions that project forwardly from the connector body;
a retractable shroud that mounts at the front end of the connector body, the retractable shroud being movable along the longitudinal axis relative to the connector body between a forward position and a rearward position, wherein the free end portions of the plurality of optical fibers project forwardly beyond the retractable shroud when the retractable shroud is in the rearward position, and wherein the free end portions are protected within the retractable shroud when the shroud is in the forward position;

first and second outboard springs for biasing the retractable shroud to the forward position relative to the connector body, wherein the fiber holder is positioned between the first and second outboard springs, wherein the first and second outboard springs have lengths that extend along the longitudinal axis of the connector body, and wherein the first outboard spring is positioned adjacent the first minor side of the connector body and the second outboard spring is positioned adjacent the second minor side of the connector body;

a rear piece connector body that is mounted to the connector body by a snap-fit connection; and rear outboard springs for biasing the fiber holder in a forward direction, wherein the rear outboard springs are captured between the rear piece connector body and the fiber holder.

2. The bare fiber connector of claim 1, wherein the connector body includes two pieces.

3. The bare fiber connector of claim 1, further comprising first and second front latches extending from the first and second minor sides of the connector body for securing the retractable shroud to the connector body, wherein grooves are defined in the first and second front latches for receiving the first and second outboard springs.

4. The bare fiber connector of claim 1, wherein the first and second minor sides of the connector body include fixed catches for engaging latches of a multi-fiber adapter when the connector body is mounted in a port of the multi-fiber adapter.

5. The bare fiber connector of claim 1, further comprising a dust cap that mounts over the retractable shroud.

6. The bare fiber connector of claim 5, wherein the dust cap includes a latch member that engages a slot defined in the retractable shroud to lock the retractable shroud relative to the connector body.

7. The bare fiber connector of claim 5, wherein the dust cap is curved along a dimension that extends along the major dimension of the connector body.

8. An optical fiber connector comprising:
a connector body that extends along a longitudinal axis of the connector body between a front end of the connector body and a rear end of the connector body, the connector body defining a profile including a major dimension extending between first and second minor sides of the connector body and a minor dimension extending between first and second major sides of the connector body;
a retractable shroud that mounts at the front end of the connector body, the retractable shroud being movable along the longitudinal axis relative to the connector body between a forward position and a rearward position; and
a dust cap that mounts over the retractable shroud, wherein the dust cap includes a latch member that engages a slot defined in the retractable shroud to lock the retractable shroud relative to the connector body.

9. The optical fiber connector of claim 8, wherein the dust cap is curved along a dimension that extends along the major dimension of the connector body.

10. The optical fiber connector of claim 8, wherein the optical fiber connector is a bare fiber connector.

11. The optical fiber connector of claim 8, wherein the first and second minor sides of the connector body include fixed catches for engaging latches of a multi-fiber adapter when the connector body is mounted in a port of the multi-fiber adapter.

12. An optical fiber connector comprising:
a connector body that extends along a longitudinal axis of the connector body between a front end of the connector body and a rear end of the connector body, the connector body defining a profile including a major dimension extending between first and second minor sides of the connector body and a minor dimension extending between first and second major sides of the connector body;
a shroud that mounts at the front end of the connector body, the shroud being movable along the longitudinal axis relative to the connector body between a forward position and a rearward position;
a fiber holder mounted within the shroud, wherein the connector body is attached to the fiber holder such that the fiber holder, the shroud, and the connector body are fitted together;
a plurality of optical fibers anchored to the fiber holder, wherein fiber ends of the plurality of optical fibers project forwardly beyond the shroud when the shroud is in the rearward position, and wherein the fiber ends are protected within the shroud when the shroud is in the forward position; and
a dust cap, wherein, when the dust cap is mounted over a front end of the shroud, the dust cap engages the fiber holder or the connector body to prevent the shroud from being moved relative to the fiber holder from the forward position to the rearward position.

13. The optical fiber connector of claim 12, wherein the dust cap includes a latch member with a projection that engages a slot defined in the shroud.

14. The optical fiber connector of claim 13, wherein the projection opposes a front end of the fiber holder to lock the fiber holder relative to the shroud to prevent the fiber holder from advancing within the shroud.

15. The optical fiber connector of claim 12, wherein the dust cap is curved along a dimension that extends along the major dimension of the connector body.

16. The optical fiber connector of claim 12, wherein the first and second minor sides of the connector body include catches for engaging latches of a multi-fiber adapter when the connector body is mounted in a port of the multi-fiber adapter.

17. The optical fiber connector of claim 12, wherein the dust cap includes spaced-apart fingers that extend through apertures defined by the shroud and engage the fiber holder to prevent the shroud from being moved relative to the fiber holder from the forward portion to the rearward position.

18. A bare fiber connector comprising:
a connector body that extends along a longitudinal axis of the connector body between a front end of the connector body and a rear end of the connector body, the connector body defining a profile including a major dimension extending between first and second minor sides of the connector body and a minor dimension extending between first and second major sides of the connector body;
a fiber holder mounted within the connector body;
a plurality of optical fibers anchored to the fiber holder, the plurality of optical fibers having free end portions that project forwardly from the connector body;

a retractable shroud that mounts at the front end of the connector body, the retractable shroud being movable along the longitudinal axis relative to the connector body between a forward position and a rearward position, wherein the free end portions of the plurality of optical fibers project forwardly beyond the retractable shroud when the retractable shroud is in the rearward position, and wherein the free end portions are protected within the retractable shroud when the retractable shroud is in the forward position;

first and second outboard springs for biasing the retractable shroud to the forward position relative to the connector body, wherein the fiber holder is positioned between the first and second outboard springs, wherein the first and second outboard springs have lengths that extend along the longitudinal axis of the connector body, and wherein the first outboard spring is positioned adjacent the first minor side of the connector body and the second outboard spring is positioned adjacent the second minor side of the connector body; and first and second front latches extending from the first and second minor sides of the connector body for securing the retractable shroud to the connector body, wherein grooves are defined in the first and second front latches for receiving the first and second outboard springs.

\* \* \* \* \*